US012324061B2

(12) United States Patent
Lau et al.

(10) Patent No.: US 12,324,061 B2
(45) Date of Patent: Jun. 3, 2025

(54) EPITAXIAL DEPOSITION CHAMBER

(71) Applicant: Applied Materials, Inc., Santa Clara, CA (US)

(72) Inventors: Shu-Kwan Lau, Sunnyvale, CA (US); Brian Hayes Burrows, San Jose, CA (US); Zhiyuan Ye, San Jose, CA (US); Richard O. Collins, Santa Clara, CA (US); Enle Choo, Saratoga, CA (US); Danny D. Wang, San Jose, CA (US); Shainish Nellikka, Bangalore (IN); Toshiyuki Nakagawa, Narita (JP); Abhishek Dube, Fremont, CA (US); Ala Moradian, Sunnyvale, CA (US); Kartik Bhupendra Shah, Saratoga, CA (US)

(73) Assignee: Applied Materials, Inc., Santa Clara, CA (US)

( * ) Notice: Subject to any disclaimer, the term of this patent is extended or adjusted under 35 U.S.C. 154(b) by 300 days.

(21) Appl. No.: 17/223,940

(22) Filed: Apr. 6, 2021

(65) Prior Publication Data

US 2022/0322492 A1 Oct. 6, 2022

(51) Int. Cl.
*H05B 3/00* (2006.01)

(52) U.S. Cl.
CPC .................................. *H05B 3/0047* (2013.01)

(58) Field of Classification Search
CPC .................................................... H05B 3/0047
USPC .......................................................... 392/416
See application file for complete search history.

(56) References Cited

U.S. PATENT DOCUMENTS 4,533,820 A * 8/1985 Shimizu ................ C30B 25/105 219/390
4,836,138 A * 6/1989 Robinson .............. C23C 16/481 427/314
4,859,832 A * 8/1989 Uehara ............. H01L 21/67115 219/405
4,975,561 A * 12/1990 Robinson .............. C23C 16/481 219/390
5,332,442 A * 7/1994 Kubodera ......... H01L 21/67115 118/728
5,370,709 A * 12/1994 Kobayashi .......... H01L 21/6838 118/728
5,792,273 A * 8/1998 Ries ...................... C23C 16/481 392/420

(Continued)

FOREIGN PATENT DOCUMENTS

JP 2548023 B2 10/1996
WO 2014176174 A1 10/2014

OTHER PUBLICATIONS

International Search Report and Written Opinion dated May 4, 2022 for Application No. PCT/US2022/013158.

(Continued)

*Primary Examiner* — Jimmy Chou
(74) *Attorney, Agent, or Firm* — Patterson + Sheridan, LLP

(57) ABSTRACT

A process chamber includes a chamber body having a ceiling disposed above a floor with a chassis and an injector ring disposed therebetween. Upper and lower clamp rings secure the upper and floors, respectively, in place. An upper heating module is coupled to the upper clamp ring above the ceiling. A lower heating module is coupled to the lower clamp ring below the floor.

20 Claims, 12 Drawing Sheets

(56) References Cited

U.S. PATENT DOCUMENTS 5,805,769 A * 9/1998 Cook ........ F24C 15/22 392/421
5,830,277 A * 11/1998 Johnsgard ........ H01L 21/67248 118/712
5,889,258 A * 3/1999 Lubomirski ........ H05B 3/0047 219/390
5,965,047 A * 10/1999 Blersch ........ H01L 21/67115 219/390
6,072,164 A * 6/2000 Tate ........ C30B 31/18 392/416
6,108,491 A * 8/2000 Anderson ........ H01L 21/67115 392/416
6,121,579 A * 9/2000 Aoki ........ C23C 16/481 219/390
6,122,440 A * 9/2000 Campbell ........ H01L 21/67115 392/420
6,153,260 A * 11/2000 Comita ........ C23C 16/481 118/728
6,167,195 A * 12/2000 Moslehi ........ C23C 16/481 219/390
6,222,990 B1 * 4/2001 Guardado ........ C30B 25/10 219/390
6,300,601 B1 * 10/2001 Suzuki ........ H01L 21/67115 118/724
6,580,059 B1 * 6/2003 Kanno ........ H01L 21/67115 219/486
6,718,127 B2 * 4/2004 Suzuki ........ H01L 21/67115 392/419
6,805,466 B1 * 10/2004 Ranish ........ H01L 21/67115 362/241
6,835,914 B2 * 12/2004 Timans ........ F27B 17/0025 118/724
6,837,589 B2 * 1/2005 Nam ........ H01L 21/67115 315/111.21
6,879,777 B2 * 4/2005 Goodman ........ H01L 21/67115 118/724
6,905,079 B2 * 6/2005 Kuwada ........ C23C 16/45565 239/128
6,970,644 B2 11/2005 Koren et al.
7,184,657 B1 * 2/2007 Camm ........ H01L 21/68728 118/724
7,658,801 B2 * 2/2010 Arami ........ F27B 17/0025 118/724
7,772,527 B2 * 8/2010 Choi ........ F27B 17/0025 392/416
7,833,348 B2 11/2010 Wada et al.
8,314,368 B2 * 11/2012 Ranish ........ H01L 21/67017 392/416
8,372,196 B2 * 2/2013 Nakamura ........ C30B 25/12 117/86
8,372,203 B2 * 2/2013 Chacin ........ C23C 16/481 118/724
8,624,165 B2 * 1/2014 Kusuda ........ H01L 21/67115 219/390
8,781,308 B2 * 7/2014 Harumoto ........ F27B 17/0025 118/724
8,951,351 B2 * 2/2015 Patalay ........ C23C 16/4585 118/728
9,650,726 B2 5/2017 Myo et al.
10,132,003 B2 11/2018 Lau et al.
10,490,427 B2 * 11/2019 Choi ........ H01L 21/67051
2001/0002668 A1 * 6/2001 Gat ........ H01L 21/67115 219/390
2001/0027969 A1 * 10/2001 Takahashi ........ H05B 3/0047 219/390
2003/0132692 A1 * 7/2003 Eguchi ........ H05B 3/0047 313/10
2004/0018008 A1 * 1/2004 Koren ........ C30B 25/105 392/416
2004/0099651 A1 * 5/2004 Johnson ........ H05B 6/105 219/390
2004/0125593 A1 * 7/2004 Nam ........ H01L 21/67115 362/92
2005/0258162 A1 * 11/2005 Kusuda ........ F27B 17/0025 118/724
2006/0291833 A1 * 12/2006 Timans ........ H01L 21/67248 392/416
2007/0104470 A1 * 5/2007 Aderhold ........ F27B 17/0025 392/422
2007/0297775 A1 12/2007 Koren et al.
2008/0152328 A1 * 6/2008 Okabe ........ H05B 3/0047 392/355
2009/0116824 A1 * 5/2009 Suzuki ........ H01L 21/67115 392/411
2009/0180766 A1 * 7/2009 Kusuda ........ H01L 21/67115 392/418
2013/0206747 A1 * 8/2013 Nishide ........ H05B 3/0047 219/538
2014/0255013 A1 * 9/2014 Ranish ........ H01L 21/67115 392/416
2014/0295106 A1 10/2014 Sivaramakrishnan et al.
2014/0319120 A1 * 10/2014 Brillhart ........ F27B 17/0025 219/405
2016/0010239 A1 * 1/2016 Tong ........ C23C 16/4584 392/416
2016/0013079 A1 1/2016 Choi et al.
2016/0195333 A1 * 7/2016 Kawarazaki ........ H01L 21/67115 438/761
2016/0227606 A1 * 8/2016 Samir ........ F26B 3/30
2016/0281262 A1 9/2016 Oki et al.
2016/0336205 A1 * 11/2016 Brillhart ........ C23C 16/481
2017/0103907 A1 * 4/2017 Chu ........ H01L 21/324
2018/0076062 A1 * 3/2018 Yamada ........ H01L 21/67115
2018/0230624 A1 8/2018 Dube et al.
2019/0006215 A1 * 1/2019 Aoyama ........ H01L 21/67115
2019/0019697 A1 * 1/2019 Miyake ........ H01L 21/68707
2020/0045776 A1 * 2/2020 Huang ........ H01L 21/67248
2021/0051771 A1 * 2/2021 Fuse ........ H01L 21/6875
2021/0151335 A1 * 5/2021 Miyake ........ H01L 21/68742
2021/0159111 A1 * 5/2021 Prengle ........ H01L 21/67115
2021/0189593 A1 6/2021 Burrows et al.

OTHER PUBLICATIONS

Office Action in related patent KR 10-2023-7013370 dated Dec. 18, 2024.
Office Action in related application TW 111109332 dated Mar. 26, 2025.

* cited by examiner

EPITAXIAL DEPOSITION CHAMBER

BACKGROUND

Field

Embodiments of the present disclosure generally relate to the architecture and functionality of an epitaxial deposition chamber.

Description of the Related Art

Semiconductor substrates are processed for a wide variety of applications, including the fabrication of integrated devices and microdevices. During processing, the substrate is positioned on a susceptor within a process chamber. The susceptor is supported by a support shaft, which is rotatable about a central axis. The interior of the process chamber is placed under vacuum while the substrate is processed by exposure to heat and process gases. The uniformity of the material deposited on the substrate may be affected by temperature variations across the surface of the substrate and by the distribution of process gases within the process chamber.

Thus, there is a need for improved process chambers that facilitate effective control over substrate temperature and process gas distribution.

SUMMARY

The present disclosure generally relates to the architecture and functionality of a process chamber, such as an epitaxial deposition chamber. In one embodiment, a process chamber includes a chamber body. The chamber body has a ceiling disposed above a floor, the ceiling and floor forming boundaries of a processing volume. An upper heating module is coupled to the chamber body above the ceiling. The upper heating module includes a first linear heating lamp having a first length, and a second linear heating lamp having a second length different from the first length. A lower heating module is coupled to the chamber body below the floor. The lower heating module includes a third linear heating lamp having a third length, and a fourth linear heating lamp having a fourth length different from the third length.

In another embodiment, a heating module for a process chamber includes an outer housing having a cooling fluid inlet and a cooling fluid exhaust. The heating module further includes a lid on the outer housing and a reflector mounting ring disposed in the outer housing. A baffle extends between the lid and the reflector mounting ring. The baffle has an opening coupled to the cooling fluid inlet. A reflector plate is coupled to the reflector mounting ring. The reflector plate includes a plurality of apertures.

In another embodiment, a process system includes a cabinet having a door, and a process chamber disposed in the cabinet. The process chamber has an upper heating module, a lower heating module, and a chamber body disposed between the upper heating module and the lower heating module. The chamber body has a loading port for a substrate, the loading port located at a first side of the chamber body. An exhaust conduit is coupled to the chamber body at a second side of the chamber body, opposite to the first side of the chamber body. The exhaust conduit is located between the chamber body and the door.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, as the disclosure may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

The present disclosure concerns the architecture and functionality of a process chamber, such as an epitaxial deposition chamber. The process chamber of the present disclosure facilitates the processing of a substrate with greater energy efficiency and less process gas usage than pre-existing processing chambers. Additionally, the process chamber of the present disclosure facilitates the processing of a substrate while mitigating the propensity to create undesirable anomalous deposition patterns at the edge of the substrate.

The process chamber of the present disclosure is configured such that an operator has easy access to ducting, power connections, and gas exhaust conduits, thereby facilitating effective and efficient maintenance of the process chamber. Furthermore, components of the process chamber of the present disclosure may be accessed for maintenance, repair, and/or replacement while maintaining a desired pressure, such as at or near a vacuum, within the compartment where a substrate is processed.

Figure 1:
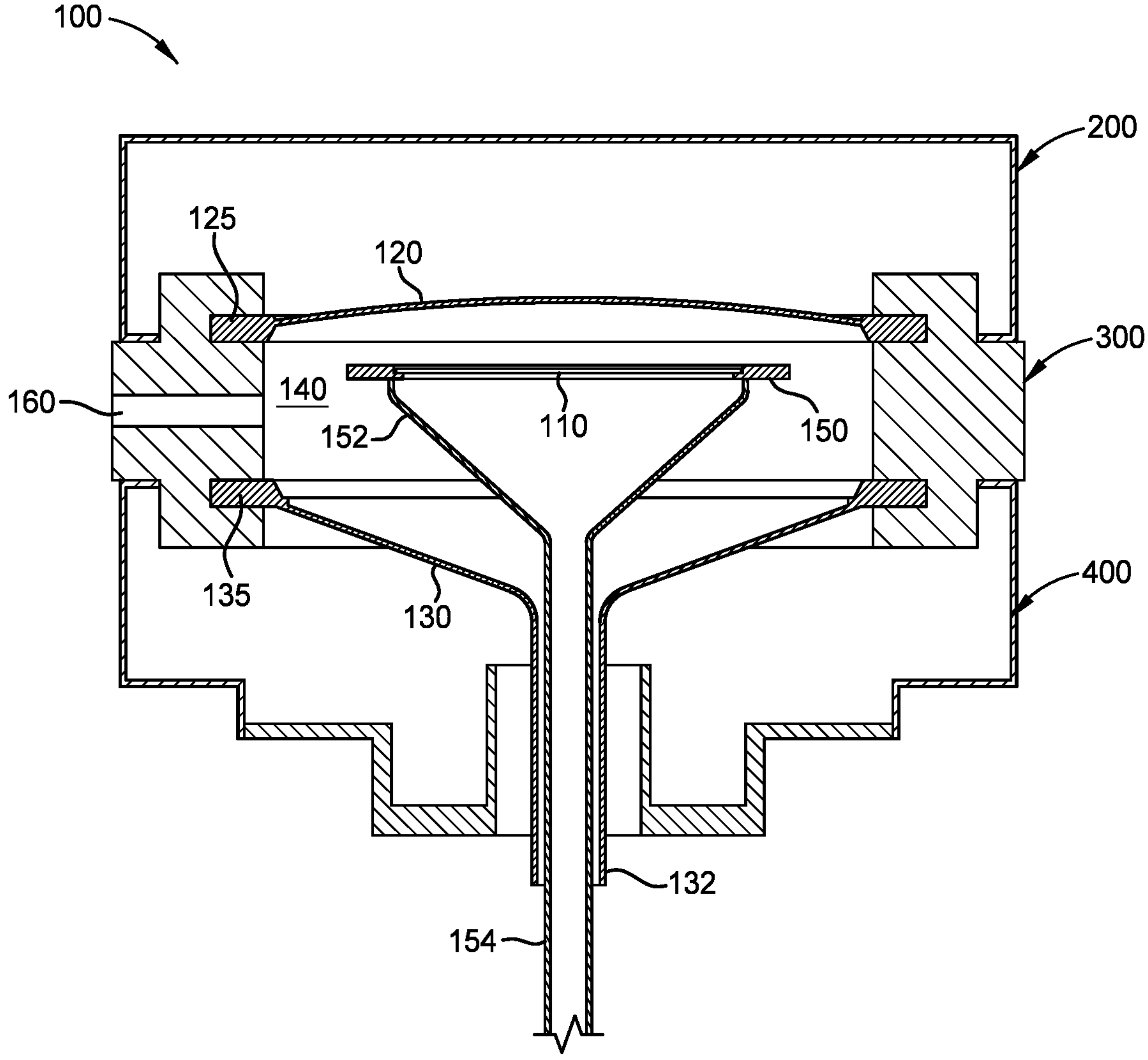
FIG. 1 depicts schematically a process chamber.

FIG. 1 shows schematically a process chamber. Process chamber 100 includes an upper heating module 200 above a chamber body 300, and a lower heating module 400 below the chamber body 300. Upper heating module 200 is shown in greater detail in FIGS. 2, 3A, and 3B. Chamber body 300 is shown in greater detail in FIGS. 4, 5, and 6. Lower heating module 400 is shown in greater detail in FIGS. 7, 8, and 9.

Process chamber 100 may be a process chamber for performing any thermal process, such as an epitaxial process. It is contemplated that while a process chamber for epitaxial process is shown and described, the concept of the present disclosure is also applicable to other process chambers capable of providing a controlled thermal cycle that heats the substrate for processes such as, for example, thermal annealing, thermal cleaning, thermal chemical vapor deposition, thermal oxidation and thermal nitridation. It is contemplated that the process chamber 100 may be used to process a substrate, including the deposition of a material on a surface of the substrate.

Referring to FIG. 1, the chamber body 300 includes a ceiling 120 and a floor 130 with a processing volume 140 therebetween. The processing volume 140 is substantially cylindrical. The ceiling 120 includes a base 125 secured in the chamber body 300, and the floor 130 includes a base 135 secured in the chamber body 300. A neck 132 coupled to the floor 130 is disposed about a shaft 154 of a susceptor support 152. The susceptor support 152 carries a susceptor 150, upon which a substrate 110 can be positioned within the processing volume 140.

It is contemplated that the susceptor 150 may be made of SiC coated graphite. A motor (not shown) rotates the shaft 154 of the susceptor support 152 about the longitudinal axis of the shaft 154, and thus rotates the susceptor 150, and the substrate 110. The substrate 110 is brought into the chamber body 300 through a loading port 160 and positioned on the susceptor 150.

The upper heating module 200 and lower heating module 400 heat the processing volume 140, such as by providing infrared radiant heat though the ceiling 120 and the floor 130, respectively. It is contemplated that the ceiling 120 and the floor 130 may be constructed from a material, such as quartz, that is substantially optically transparent. It is further contemplated that the material of the ceiling 120 and the floor 130 may be substantially transparent to infrared radiation, such that at least 95% of incident infrared radiation may be transmitted therethrough.

Figure 2:
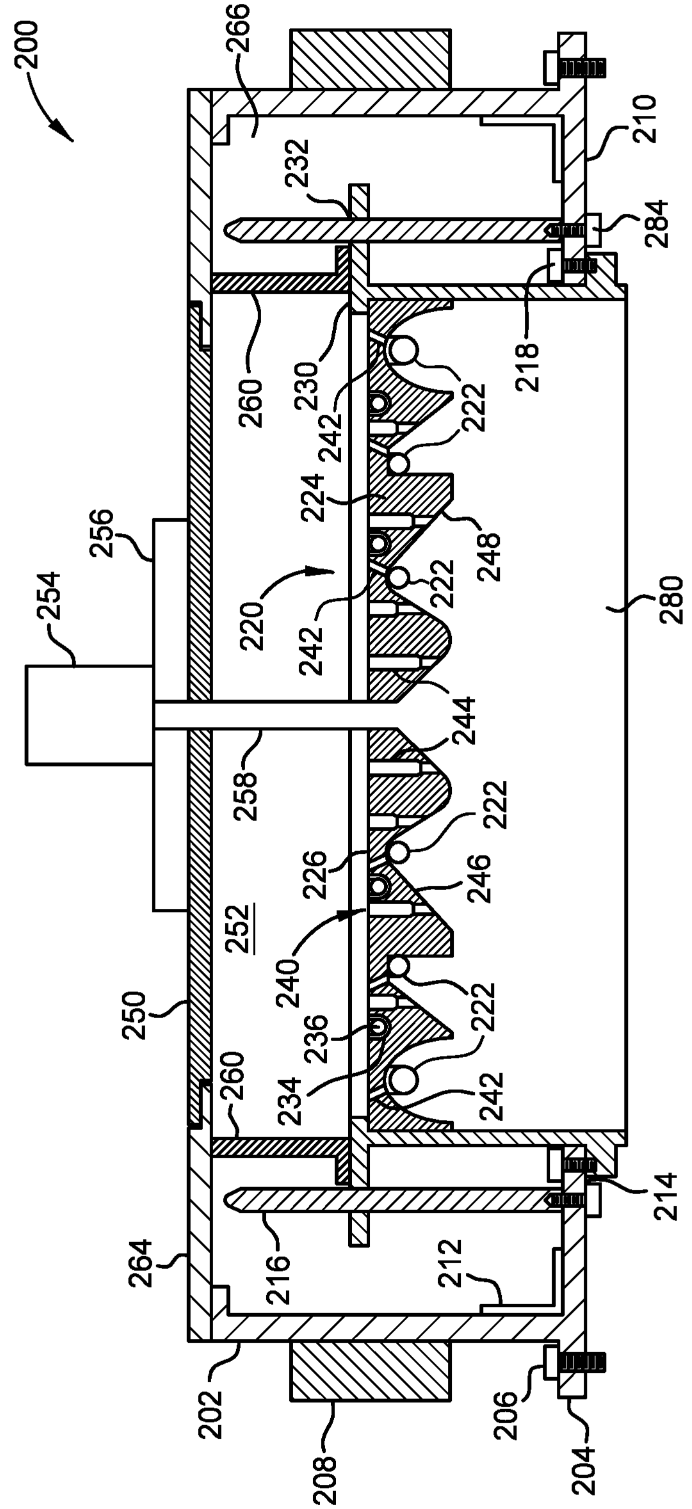
FIG. 2 depicts a schematic partial cross-sectional side view of part of the process chamber of FIG. 1.

FIG. 2 depicts a schematic partial cross-sectional side view of the upper heating module 200. The upper heating module 200 includes an outer housing 202. The outer housing 202 generally is an annular body having a lower flange 204 through which one or more fasteners 206 extend for connection to the chamber body 300. One or more lifting brackets 208 are attached to an outer surface of the outer housing.

The outer housing 202 is coupled to a lamp mounting ring 210 disposed therein. The lamp mounting ring 210 is coupled to the outer housing 202 via one or more brackets 212. The lamp mounting ring 210 is coupled to a heating lamp assembly 220. The heating lamp assembly 220 includes a plurality of linear heating lamps 222 that extend across a central opening of the lamp mounting ring 210. An annular heat shield 280 is coupled to the lamp mounting ring 210. The annular heat shield 280 is coupled to protrusions 214 extending radially inwardly from the lamp mounting ring 210 in any suitable manner, for example, via fasteners 218. The annular heat shield 280 reflects heat from the linear heating lamps 222 towards the ceiling 120. In some embodiments, it is contemplated that the annular heat shield 280 may be made from and/or coated with a reflective material. For example, the annular heat shield 280 may be gold plated.

The central opening of the lamp mounting ring 210 is substantially circular, and thus the annular heat shield 280 is substantially cylindrical. When the upper heating module 200 is assembled into the complete process chamber 100, each linear heating lamp 222 extends substantially horizontally above the ceiling 120. The linear heating lamps 222 are oriented substantially parallel to each other, such as within five degrees. A linear heating lamp 222 that extends across and above a peripheral portion of the ceiling 120 is shorter than a linear heating lamp 222 that extends across and above a central portion of the ceiling 120. Similarly, because the processing volume 140 is substantially cylindrical, a linear heating lamp 222 that extends across and above a peripheral portion of the processing volume 140 is shorter than a linear heating lamp 222 that extends across and above a central portion of the processing volume 140. Such an arrangement of linear heating lamps 222 provides efficiencies for the process chamber 100 having the substantially cylindrical processing volume 140 of the present disclosure compared to other chambers that do not have a substantially cylindrical processing volume. For example, a processing volume that is quadrilateral or hexagonal shaped when viewed from above has zones in corners that must be heated, which takes time and energy, whereas the substantially cylindrical processing volume 140 of the present disclosure has no such corners. Thus, the heating of the processing volume 140 of the present disclosure may be achieved faster and/or more efficiently than for other processing volumes.

A reflector mounting ring 230 is disposed about and coupled to an upper surface 226 of an upper reflector plate 224. When the process chamber 100 is assembled, the upper reflector plate 224 is disposed above the ceiling 120. A lower surface 248 of the upper reflector plate 224 includes a plurality of linear channels 246 extending substantially parallel to each other across the lower surface 248. In some embodiments, it is contemplated that the lower surface 248 of the upper reflector plate 224 includes two or more linear channels 246. For example, the lower surface 248 of the upper reflector plate 224 may include three, four, five, six, seven, eight, nine, ten, or more linear channels 246. The plurality of linear heating lamps 222 extend within the plurality of linear channels 246, and thus heat from the linear heating lamps 222 is reflected off of sidewalls of the linear channels 246 towards the ceiling 120 in addition to being radiated towards the ceiling 120 directly. As shown in FIG. 2, each linear heating lamp 222 is located in a corresponding one of the plurality of linear channels 246. In some embodiments, it is contemplated that more than one linear heating lamp 222 may be located in a corresponding one of the plurality of linear channels 246.

Each linear channel 246 has a cross-sectional profile configured to reflect heat in a pre-determined distribution pattern. For example, the pre-determined distribution pattern may produce a substantially even distribution of heat. Alternatively, the pre-determined distribution pattern may focus peak irradiation at one or more specific regions on the substrate 110 undergoing processing to enable control of temperature at those regions. It is contemplated that each linear channel 246 has at least one of a U-shaped cross section; a geometric straight-sided cross section, such as a V-shaped cross section, a rectangular cross section, a pentagonal cross section, a hexagonal cross section, or greater than six-sided cross section; a curved cross section, such as a portion of a circle, a portion of an ellipse, or a portion of a parabola; or a combination thereof.

As an example, an elliptical cross-sectional shape may facilitate the focusing of infrared radiation from a linear heating lamp 222. As another example, a parabolic cross-sectional shape may facilitate the collimating of infrared radiation from a linear heating lamp 222. As a further example, an angular cross-sectional shape may facilitate the diffusion of infrared radiation from a linear heating lamp 222. In some embodiments, it is contemplated that one or more linear channel 246 may have a cross section that is the same as another one or more linear channel 246. In some embodiments, it is contemplated that one or more linear channel 246 may have a cross section that is different from another one or more linear channel 246. In some embodiments, it is contemplated that one or more linear channel 246 may have a cross section that varies from a first shape to a second shape along a length of the linear channel 246.

Thus, the lower surface 248 of the upper reflector plate 224 can be designed to deliver irradiance peaks at many locations across the substrate 110 undergoing processing to contribute to the facilitation of a desired thermal profile. In some embodiments, the upper reflector plate 224 is configured to generate up to as many irradiance peaks as the number of lamps in the plurality of linear heating lamps 222. In some embodiments, the upper reflector plate 224 is configured to generate a greater number of irradiance peaks than the number of lamps in the plurality of linear heating lamps 222. In some embodiments, it is contemplated that the upper reflector plate 224 may be made from and/or coated with a reflective material. For example, the upper reflector plate 224 may be gold plated. In some embodiments, the upper reflector plate 224 includes a plurality of portions that are coupled together to form a disk-shaped plate.

A plurality of alignment pins 216 are coupled to the lamp mounting ring 210. Each pin of the plurality of alignment pins 216 is coupled to a corresponding one of the protrusions 214, such as by a fastener 284. The plurality of alignment pins 216 are configured to extend through openings 232 in the reflector mounting ring 230 to align and removably couple the lamp mounting ring 210 to the reflector mounting ring 230. The lamp mounting ring 210 is removably coupled to the reflector mounting ring 230 so that the reflector mounting ring 230 can be easily removed to gain access to the linear heating lamps 222 for replacement and access to an interior of the process chamber 100 for visual inspection.

The upper heating module 200 includes a baffle 260 coupled to a top surface of the reflector mounting ring 230. The baffle 260 is generally annular, extending along the top surface of the reflector mounting ring 230. A lid of the upper heating module 200 includes a flange 264, extending radially inwardly from the outer housing 202, and a top plate 250 coupled to the flange 264. The baffle 260 extends between the lid and the reflector mounting ring 230. One or more temperature sensors, such as one or more pyrometers 254, are mounted to a base 256 on the top plate 250. In some embodiments, it is contemplated that the base 256 may include a heat exchanger to provide cooling by a suitable fluid, such as water, supplied via a connecting hose (not shown). Each pyrometer 254 may be mounted so as to measure the surface temperature of a discrete portion of the substrate 110 undergoing processing, such measurement facilitated via a corresponding pyrometer tube 258.

As shown in FIG. 2, the upper surface 226 of the upper reflector plate 224 includes a plurality of coolant channels 234. In some embodiments, the plurality of coolant channels 234 extend parallel to the plurality of linear heating lamps 222. A cooling tube 236 is disposed in each coolant channel 234 to convey a coolant, such as water or a refrigerant, such as R-22, R-32, or R-410A. In some embodiments, a single cooling tube 236 may be routed in one coolant channel 234, then out of the coolant channel 234 and across into another coolant channel 234. In some embodiments, the number of coolant channels 234 corresponds with the number of the plurality of linear channels 246. In some embodiments, it is contemplated that the coolant channels 234 and cooling tubes 236 may be omitted.

An interior volume 252 is bounded at least in part by the top plate 250 and baffle 260. One or more opening 262 permits a cooling fluid, such as a gas, such as air, to enter the interior volume 252. The upper reflector plate 224 includes apertures, such as cooling slots 240, extending from the upper surface 226 to the lower surface 248. The cooling slots 240 are configured to route a cooling fluid, such as a gas, such as air, through the upper reflector plate 224. In some embodiments, it is contemplated that the cooling slots 240 may include a plurality of first slots 242 configured to cool the plurality of linear heating lamps 222 to maintain a target lamp temperature. An exemplary target lamp temperature is less than 800 degrees Celsius. As shown in FIG. 2, the first slots 242 are configured to direct cooling fluid generally towards each linear heating lamp 222. In some embodiments, it is contemplated that the cooling slots 240 may include a plurality of second slots 244 to direct the cooling fluid towards the ceiling 120. An exemplary target temperature of the ceiling 120 is about 200 to about 600 degrees Celsius.

It is contemplated that the numbers, sizes, and/or flow areas of first slots 242 relative to second slots 244 may be configured according to a desired proportion of cooling fluid to be flowed through each of the first slots 242 and the second slots 244. For example, it is contemplated that the desired total flow rate of cooling fluid through the first slots 242 may be greater than, equal to, or less than the desired total flow rate of cooling fluid through the second slots 244. Similarly, it is contemplated that the actual total flow rate of cooling fluid through the first slots 242 may be greater than, equal to, or less than the actual total flow rate of cooling fluid through the second slots 244. Thus, it is contemplated that the number of first slots 242 may be greater than, equal to, or less than the number of second slots 244. Additionally, it is contemplated that the size of first slots 242 may be greater than, equal to, or less than the size of second slots 244. Furthermore, it is contemplated that the flow area of first slots 242 may be greater than, equal to, or less than the flow area of second slots 244.

In some embodiments, it is contemplated that the cooling slots 240 are configured to give adequate backpressure to provide a desired flow pattern through the cooling slots 240. For example, the numbers, sizes, and/or flow areas of the cooling slots 240 may be configured such that the flow rate of cooling fluid through one first slot 242 may be greater than, equal to, or less than the flow rate of cooling fluid through another first slot 242. Similarly, the numbers, sizes, and/or flow areas of the cooling slots 240 may be configured such that the flow rate of cooling fluid through one second slot 244 may be greater than, equal to, or less than the flow rate of cooling fluid through another second slot 244.

Figure 3A:
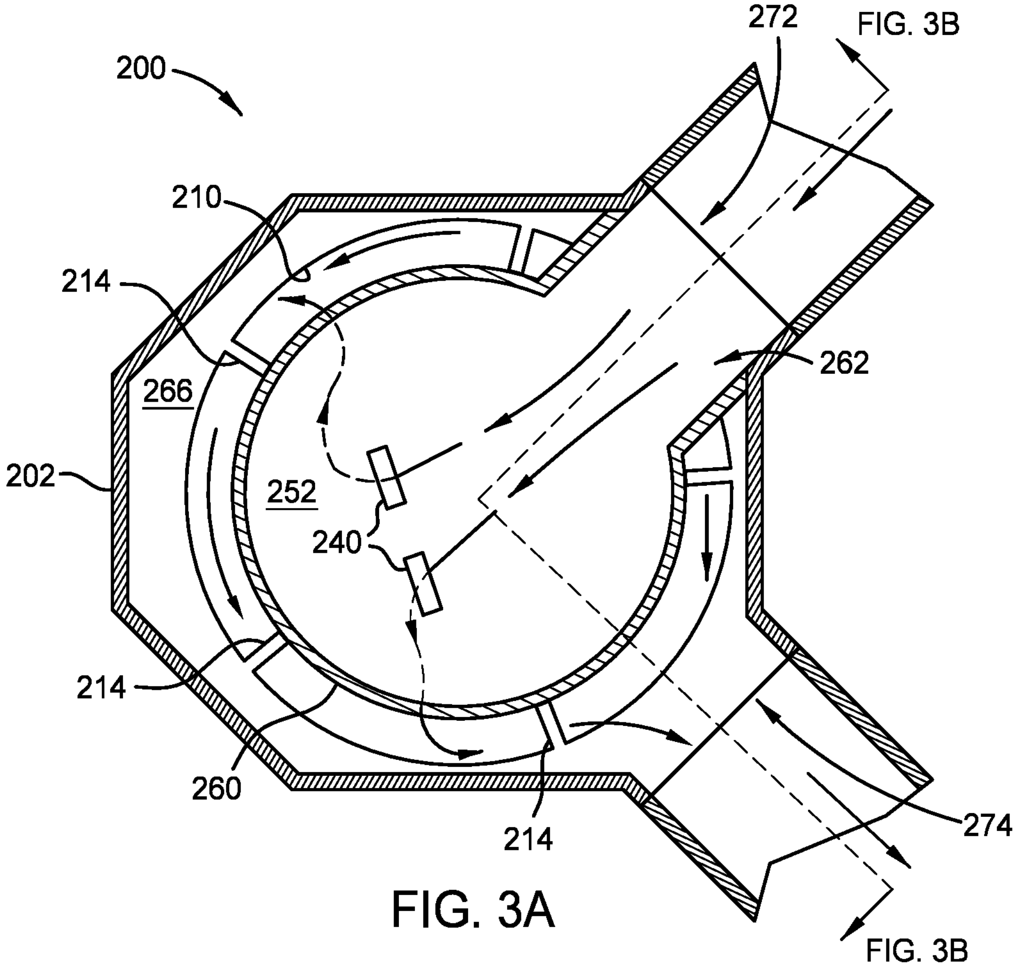
FIGS. 3A and 3B illustrate schematically the flow of cooling fluid through the part of the process chamber depicted in FIG. 2.
Figure 3B:
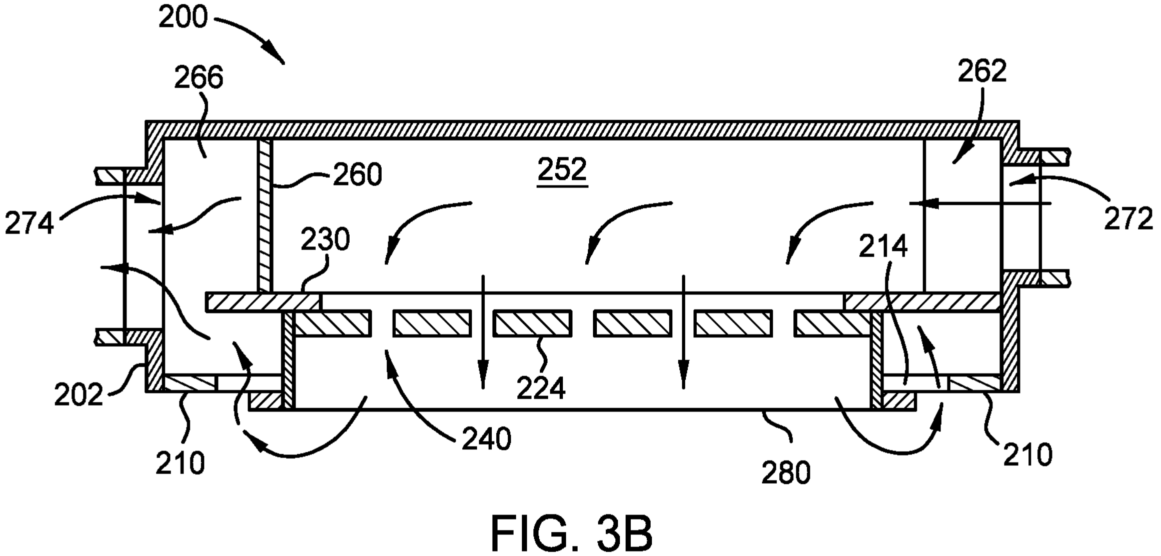

FIGS. 3A and 3B illustrate schematically the flow of cooling fluid through the upper heating module 200. Exemplary flow of cooling fluid is represented by arrows. FIG. 3A provides a top view of exemplary cooling fluid flow paths, and FIG. 3B provides a split cross-sectional side view of exemplary cooling fluid flow paths. Cooling fluid, such as a gas, such as air, enters the upper heating module 200 through inlet 272. One or more openings 262 permit the cooling fluid to enter the interior volume 252. The baffle 260 inhibits direct fluid communication between the inlet 272 and an exhaust 274, but directs the cooling fluid through the cooling slots 240. Cooling fluid that passes through the first slots 242 cools some portions of the upper reflector plate 224 and the linear heating lamps 222. Cooling fluid that passes through the second slots 244 cools other portions of the upper reflector plate 224.

The cooling fluid passes through the cooling slots 240 and into the annular heat shield 280. It is contemplated that the cooling fluid that contacts the annular heat shield 280 may cool the annular heat shield 280. The annular heat shield 280 directs the cooling fluid out the bottom of the annular heat shield 280 and towards the ceiling 120. It is contemplated that at least a portion of the cooling fluid may impinge upon a surface of the ceiling 120, thereby cooling the ceiling 120. The cooling fluid then passes between the outer housing 202 and the annular heat shield 280 and around the protrusions 214 into an annular volume 266 between the outer housing and the baffle 260. The cooling fluid then exits the annular volume 266 through the exhaust 274.

Figure 4:
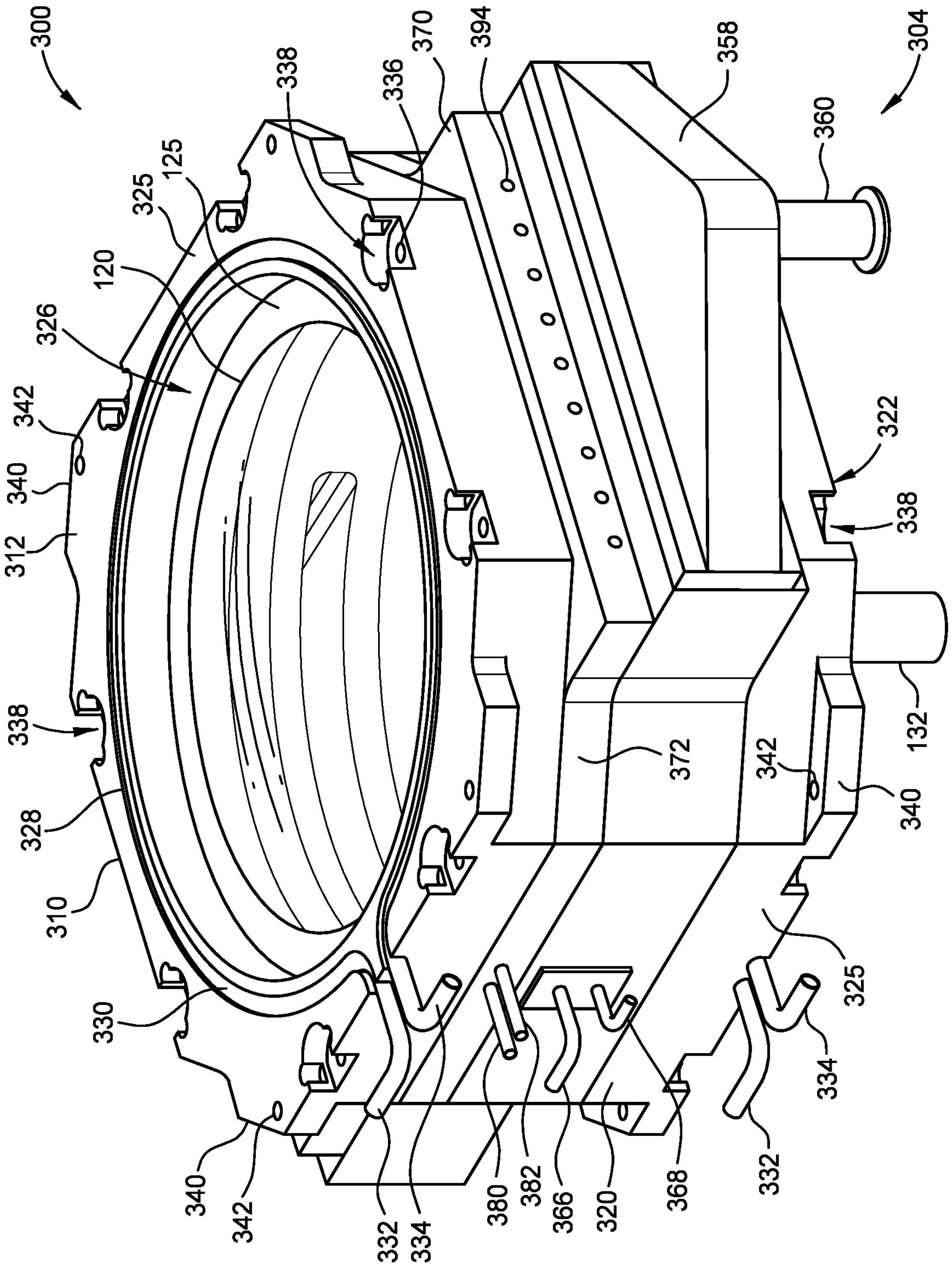
FIG. 4 is an isometric external view of another part of the process chamber of FIG. 1.
Figure 5:
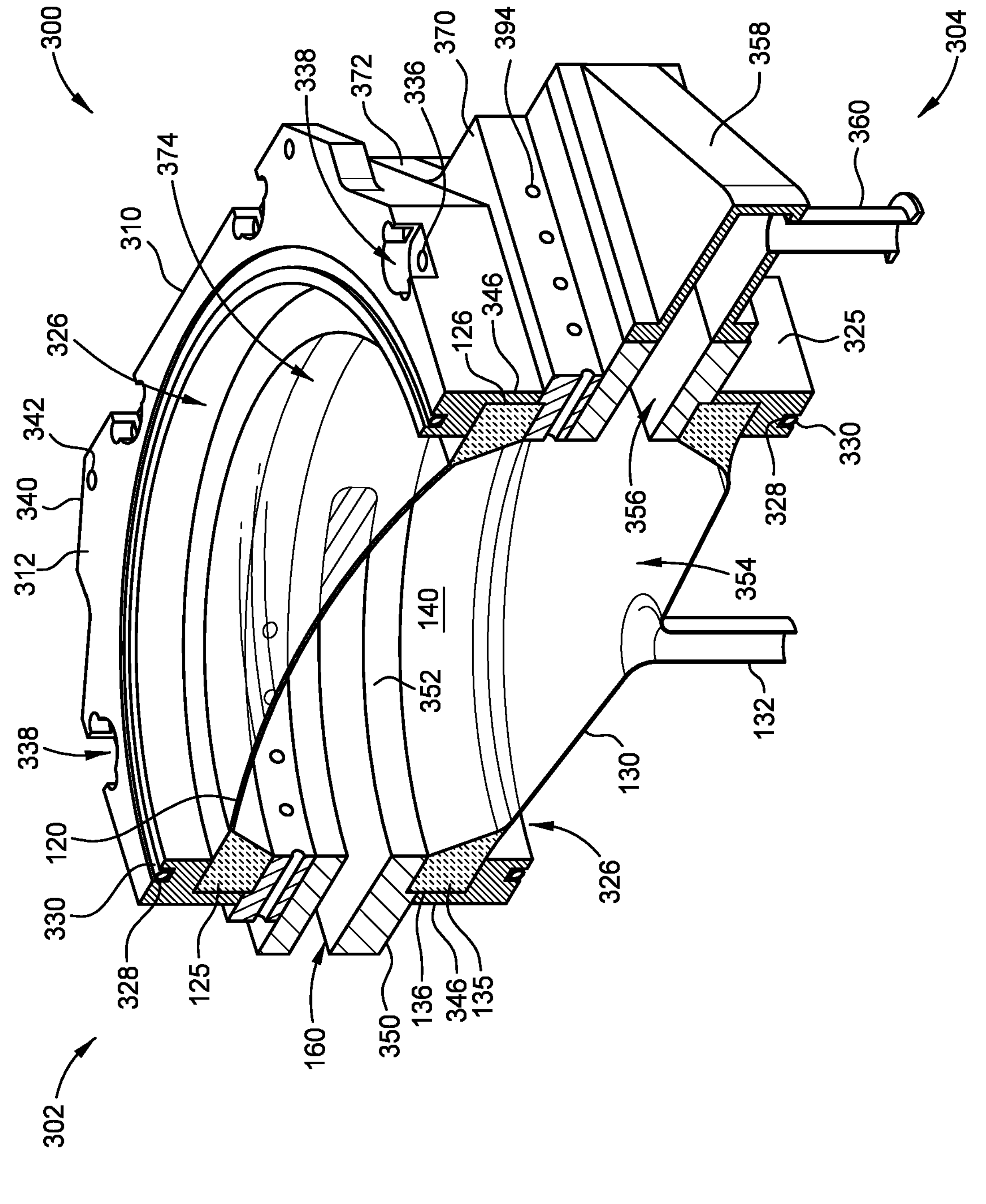
FIG. 5 is a combined cross-sectional and isometric three-quarter side view of the part of the process chamber depicted in FIG. 4.

FIG. 4 is an isometric external view of the chamber body 300, and FIG. 5 is a combined cross-sectional and isometric three-quarter side view of the chamber body 300. Referring to both FIGS. 4 and 5, chamber body 300 includes an upper clamp ring 310 and a lower clamp ring 320. A chassis 350 and an injector ring 370 are located between the upper and lower clamp rings 310, 320.

The upper and lower clamp rings 310, 320 are substantially similar in design, and therefore various common features of each clamp ring 310, 320 are denoted by the same reference numerals. The upper and lower clamp rings 310, 320 are arranged upon assembly such that an upper surface 312 of the upper clamp ring 310 is equivalent to a lower surface 322 of the lower clamp ring 320, and a lower surface of the upper clamp ring 310 is equivalent to an upper surface of the lower clamp ring 320.

Each clamp ring 310, 320 has a generally annular body 325 with an opening 326. A groove 328 in the upper surface 312 of the upper clamp ring 310, and in the corresponding lower surface 322 of the lower clamp ring 320, substantially surrounds the opening 326, and contains a heat exchange tube 330. It is contemplated that heat exchange fluids may be flowed through the heat exchange tube 330 in order to provide heating or cooling directly to the body 325 of each clamp ring 310, 320. Heat exchange fluids enter the heat exchange tube 330 via an inlet 332, and exit the heat exchange tube 330 via an outlet 334.

Upon assembly of the chamber body 300, clamping rods (not shown) inserted through holes 336 in peripheral portions of each clamp ring 310, 320 facilitate the connection and securement of the upper and lower clamp rings 310, 320 with the injector ring 370 and chassis 350 therebetween. Upon assembly of the chamber body 300, clamping fasteners (not shown) attached to each clamping rod positioned in corresponding recesses 338 in the body 325 of each clamp ring 310, 320 are tightened on each clamping rod to secure the upper and lower clamp rings 310, 320 to the injector ring 370 and chassis 350 therebetween.

Figure 7:
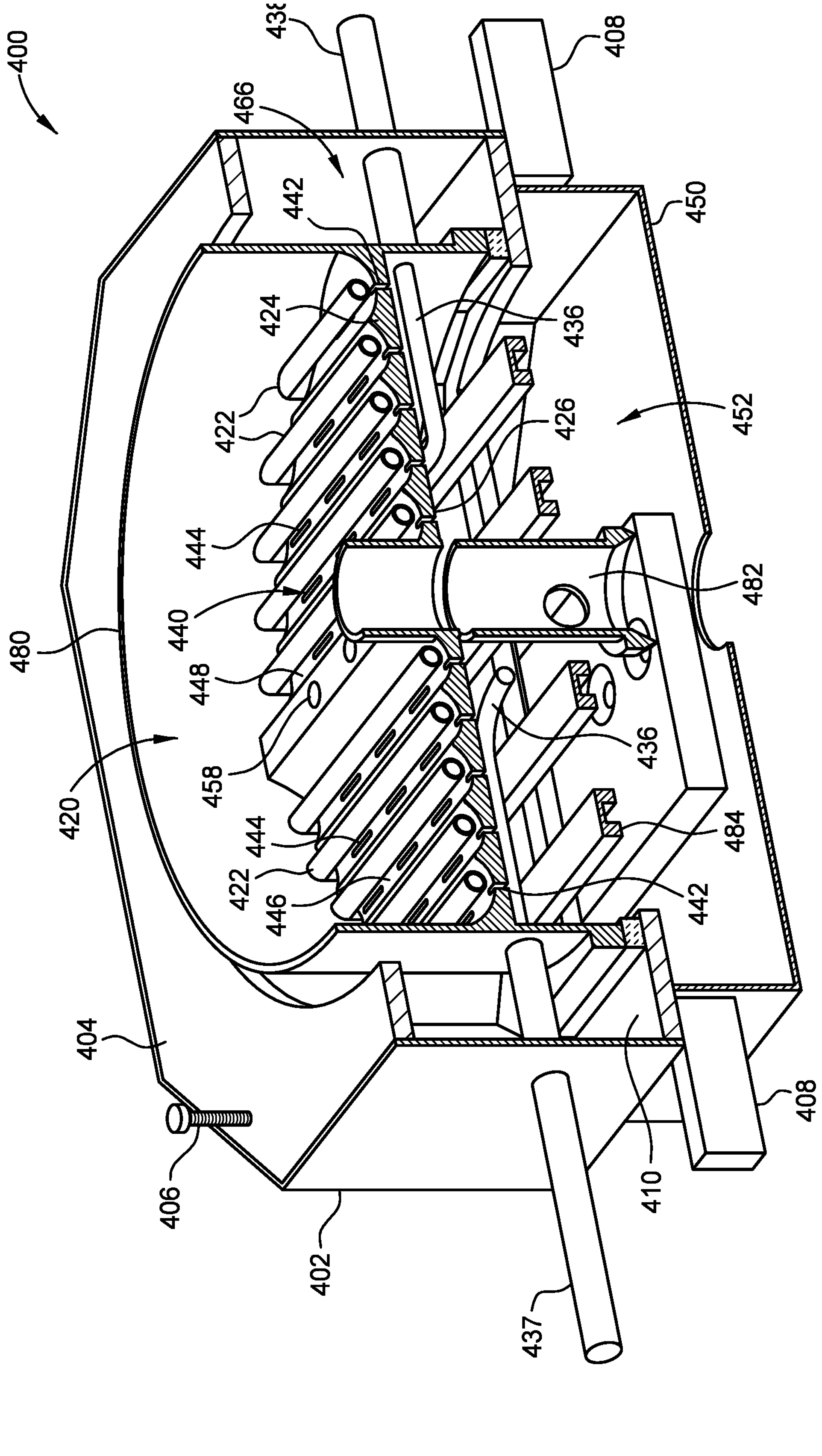
FIG. 7 is a combined cross-sectional and isometric three-quarter side view of another part of the process chamber of FIG. 1.

Lips 340 projecting laterally outwardly from the body 325 of each clamp ring 310, 320 have connection points 342 for other components of the process chamber 100. Hence, lips 340 and connection points 342 on the upper clamp ring 310 provide for connection to the upper heating module 200, such as via fasteners 206 (FIG. 2). Similarly, lips 340 and connection points 342 on the lower clamp ring 320 provide for connection to the lower heating module 400, such as via fasteners 406 (FIG. 7).

As best shown in FIG. 5, the base 125 of the ceiling 120 is secured between the upper clamp ring 310 and the injector ring 370. A skirt 346 encloses an outer edge 126 of the base 125 of the ceiling 120. The ceiling 120 protrudes into the opening 326 in the upper clamp ring 310. In some embodiments, it is contemplated that the ceiling 120 may protrude through the opening 326 in the upper clamp ring 310 beyond the upper surface 312 of the upper clamp ring 310. In some embodiments, it is contemplated that the ceiling 120 may not protrude through the opening 326 in the upper clamp ring 310 beyond the upper surface 312 of the upper clamp ring 310.

As best shown in FIG. 5, the base 135 of the floor 130 is secured between the lower clamp ring 320 and the chassis 350. A skirt 346 encloses an outer edge 136 of the base 135 of the ceiling 130. The floor 130 protrudes into the opening 326 in the lower clamp ring 320. In some embodiments, it is contemplated that the floor 130 may protrude through the opening 326 in the lower clamp 320 ring beyond the lower surface 322 of the lower clamp ring 320. In some embodiments, it is contemplated that the floor 130 may not protrude through the opening 326 in the lower clamp ring 320 beyond the lower surface 322 of the lower clamp ring 320. Nevertheless, the neck 132 extends beyond the lower surface 322 of the lower clamp ring 320.

Thus, the processing volume 140 is bounded at the top by the ceiling 120, at the bottom by the floor 130, and at the sides by the chassis 350 and the injector ring 370.

The chassis 350 has a generally annular body 352 with an opening 354 that corresponds in size and location with the openings 326 of each clamp ring 310, 320. The loading port 160 is located at one side of the chassis 350. A gas outlet 356 is located at a side of the chassis 350 opposite the loading port 160. An exhaust cap 358 is coupled to the gas outlet 356, and serves to route gases from the processing volume 140 to a vacuum system (530, FIG. 10) via an exhaust conduit 360. Upon assembly of the chamber body 300, the gas outlet 356 and exhaust cap 358 are located on an exhaust side 304 of the chamber body 300. With reference to FIG. 4, it is contemplated that heat exchange fluids may be circulated within the chassis 350 via an inlet 366 and an outlet 368.

The injector ring 370 is positioned between the upper clamp ring 310 and the chassis 350. The injector ring 370 has a generally annular body 372 with an opening 374 that corresponds in size and location with the openings 354, 326 of the chassis 350 and each clamp ring 310, 320, respectively. With reference to FIG. 4, it is contemplated that heat exchange fluids may be circulated within the injector ring 370 via an inlet 380 and an outlet 382.

The injector ring 370 has a plurality of monitoring ports 394 at the exhaust side 304 of the chamber body 300. Each monitoring port 394 permits entry of a monitoring probe into the processing volume 140. In some embodiments, it is contemplated that the monitoring probe may be inserted through a monitoring port 394 into the processing volume 140, and take measurements of in situ parameters, such as temperature and/or pressure, to facilitate calibration with other sensors and thereby assist in the control of processes performed in the process chamber 100. For example, the monitoring probe may be a temperature measuring device, such as a thermocouple, or a pressure monitoring device, such as a piezo pressure transducer. Additionally, or alternatively, the monitoring probe may be configured to take a sample of the gasses in the processing volume 140. As illustrated, the injector ring 370 has a plurality of monitoring ports 394, and thus multiple monitoring probes may be deployed simultaneously, each monitoring probe being inserted into the processing volume 140 through a corresponding monitoring port 394. When not in use, each monitoring port 394 is closed with a suitable plug and/or cap.

Figure 6:
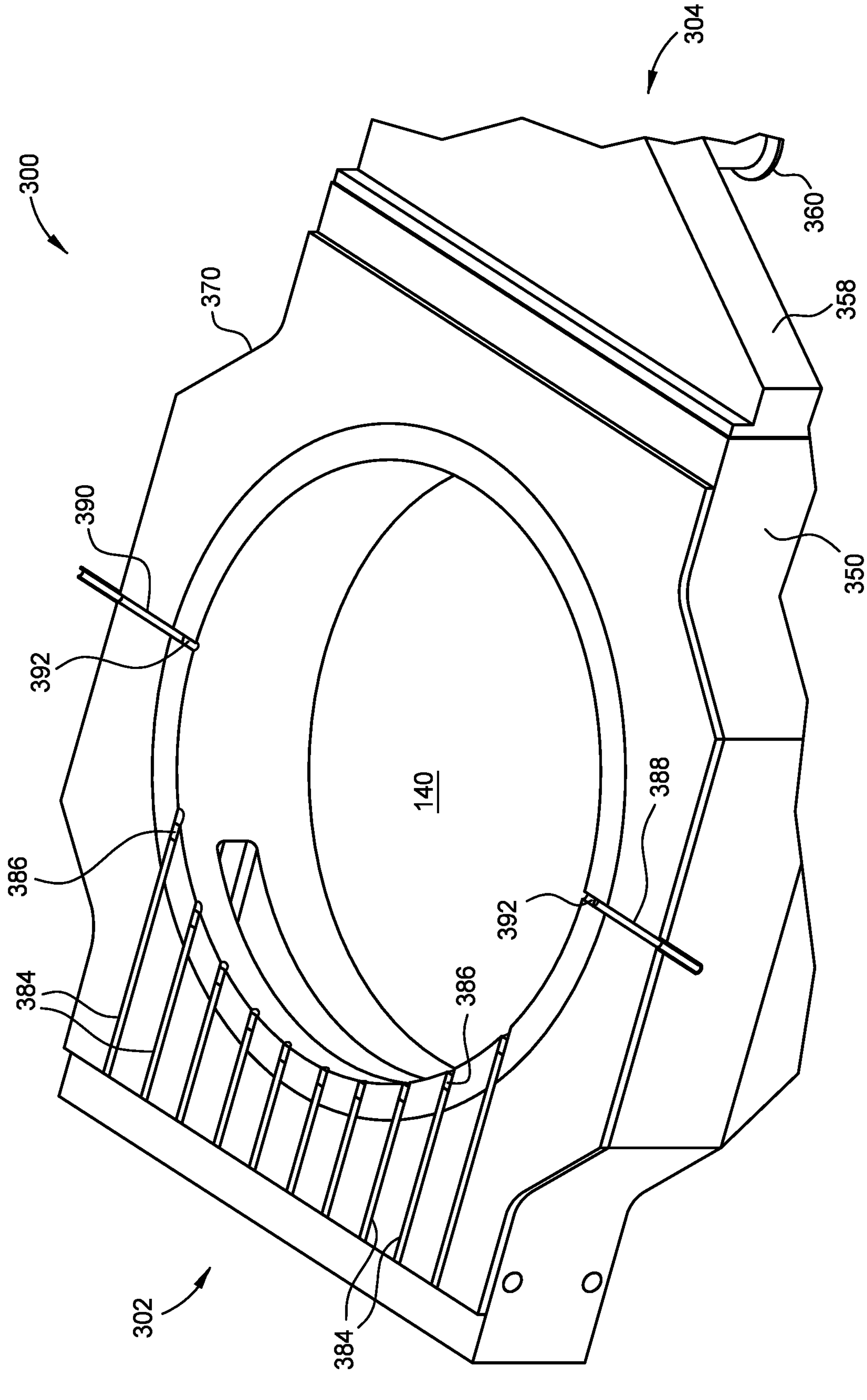
FIG. 6 is an isometric three-quarter top view including a cross section of the part of the process chamber depicted in FIG. 4.

FIG. 6 is an isometric three-quarter top view of the chamber body 300 including a cross section through the injector ring 370. The injector ring 370 has a plurality of gas injection primary flow paths 384. Each primary flow path 384 routes process gases into the processing volume 140 through corresponding nozzles 386. In some embodiments, the nozzles 386 are made from quartz. The primary flow paths 384 are parallel to each other, are substantially straight, and are located at one side of the injector ring 370. Upon assembly of the chamber body 300, the primary flow paths 384 are located on an injection side 302 of the chamber body 300 that is opposite to the exhaust side 304 of the chamber body 300. Thus, the primary flow paths 384 are oriented to direct process gases through the processing volume 140 from the injection side 302 of the chamber body 300 to the exhaust side 304 of the chamber body 300 in a substantially linear bearing.

The injector ring 370 also has first and second gas injection secondary flow paths 388, 390. The secondary flow paths 388, 390 route process gases into the processing volume 140 through corresponding nozzles 392. In some embodiments, the nozzles 392 are made from quartz. Each secondary flow path 388, 390 is located at respective opposite sides of the injector ring 370 between the injection side 302 and the exhaust side 304 of the chamber body 300. Although a single secondary flow path 388, 390 is illustrated at each side, in some embodiments it is contemplated that the injector ring 370 may have two, three, four, five, six, or more secondary flow paths 388, 390 at one or both sides.

Each secondary flow path 388, 390 is substantially straight, and is oriented substantially at 90 degrees to the orientation of the primary flow paths 384. Thus, each secondary flow path 388, 390 is oriented to direct process gases through the processing volume 140 at substantially 90 degrees to the direction of flow of process gases emerging from the primary flow paths 384. In some embodiments, it is contemplated that each secondary flow path 388, 390 may be oriented at an angle less than 90 degrees to the orientation of the primary flow paths 384, such as at 85 degrees or less, 75 degrees or less, 60 degrees or less, or 45 degrees or less.

It is contemplated that process gases may flow from the primary flow paths 384, through the processing volume 140, and out through the gas outlet 356, exhaust cap 358, and exhaust conduit 360. It is contemplated that process gases may flow from the secondary flow paths 388, 390, through the processing volume 140, and out through the gas outlet 356, exhaust cap 358, and exhaust conduit 360. It is contemplated that during the processing of a substrate 110, when process gases flow only from the primary flow paths 384, and no gases flow from the secondary flow paths 388, 390, the concentration of process gases at an edge of the substrate 110 may be less than the concentration of process gases at a center of the substrate 110. It is contemplated that during the processing of a substrate 110, when process gases flow simultaneously from the primary flow paths 384 and the secondary flow paths 388, 390 into the processing volume 140, the cross-flow created by the flow from the secondary flow paths 388, 390 interacting with the flow from the primary flow paths 384 provides for greater uniformity of the concentration of the process gases between the center of the substrate 110 and the edge of the substrate 110.

With reference to FIG. 5, the chamber body 300 is assembled with the ceiling 120 secured at the base 125 between the upper clamp ring 310 and the injector ring 370. The injector ring 370 is in turn secured to the chassis 350, and the floor 130 secured at the base 135 between the chassis 350 and the lower clamp ring 320. Seals between: the base 125 of the ceiling 120 and the injector ring 370; the injector ring 370 and the chassis 350; and the chassis 350 and the base 135 of the floor 130 enable the processing volume 140 to be maintained at a pressure that is different from a pressure external to the processing volume, such as a pressure external to the process chamber 100, a pressure within the upper heating module 200, and/or a pressure within the lower heating module 400. In some embodiments, it is contemplated that the pressure within the processing volume 140 may be lower than a pressure external to the processing volume 140. In some embodiments, it is contemplated that the pressure within the processing volume 140 may be at or near a vacuum.

In some embodiments, it is contemplated that the pressure within the processing volume 140 may be maintained at a desired level, such as at or near a vacuum, while components of the process chamber 100 that are outside the chamber body 300 are undergoing maintenance, repair, and/or replacement. For example, one or more components of the upper heating module 200 and/or the lower heating module 400 may be inspected, cleaned, repaired, and/or replaced while the pressure within the processing volume 140 is maintained at a desired level, such as at or near a vacuum. In some embodiments, it is contemplated that the upper heating module 200 may be removed from, and/or attached to, the chamber body 300 while the pressure within the processing volume 140 is maintained at a desired level, such as at or near a vacuum. In some embodiments, it is contemplated that the lower heating module 400 may be removed from, and/or attached to, the chamber body 300 while the pressure within the processing volume 140 is maintained at a desired level, such as at or near a vacuum.

Figure 8:
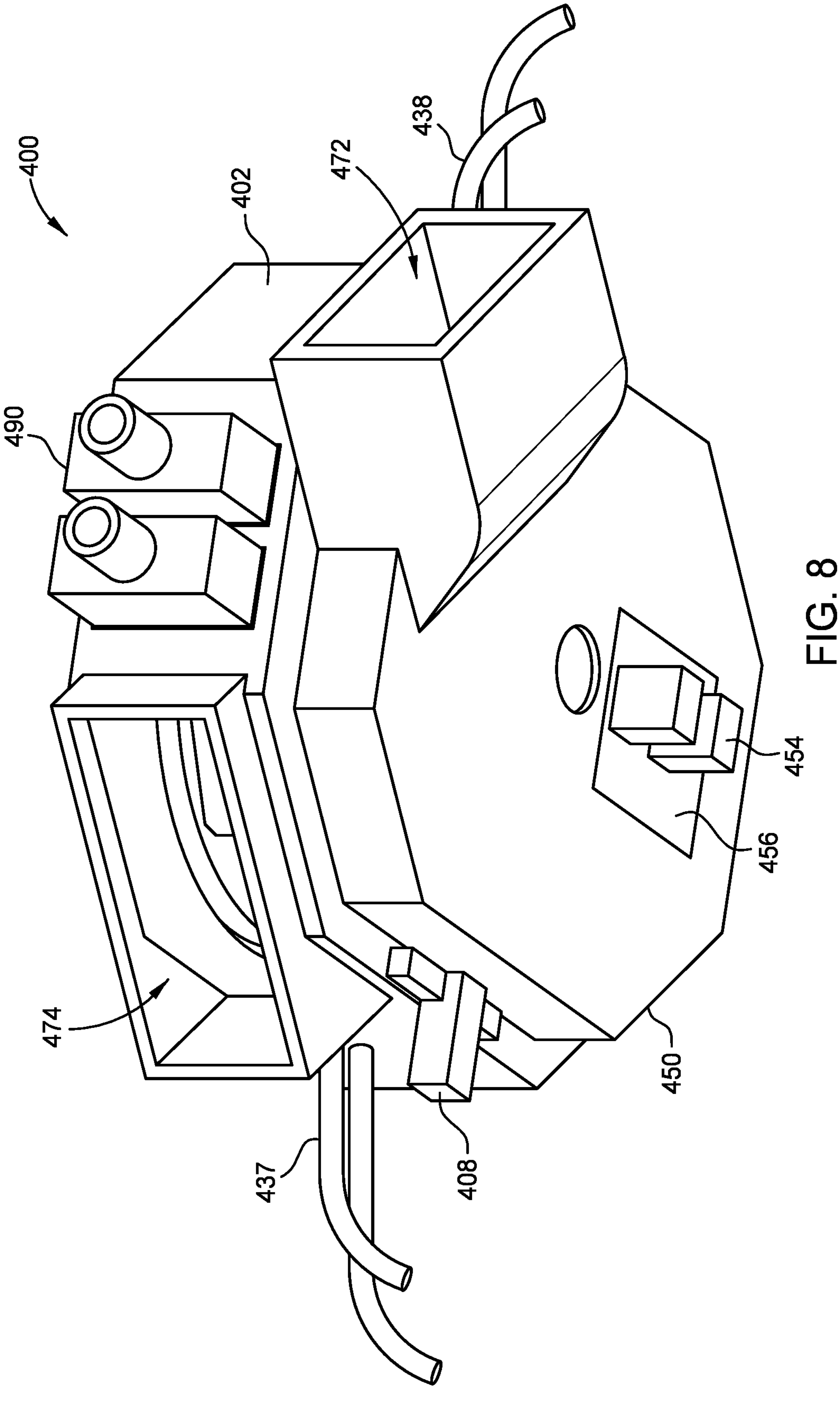
FIG. 8 is an isometric external view of the part of the process chamber depicted in FIG. 7, viewed from below.

FIG. 7 is a combined cross-sectional and isometric three-quarter side view of the lower heating module 400, and FIG. 8 is an isometric external view of the lower heating module 400 viewed from below. With reference to FIG. 7, the lower heating module 400 includes an outer housing 402. The outer housing 402 generally is an annular body coupled to, or integral with, an adapter plate 404. Fasteners 406 connect the adapter plate 404 to the chamber body 300 when the process chamber 100 is assembled. One or more lifting brackets 408 are attached to an outer surface of the outer housing 402.

The outer housing 402 is coupled to a separation plate 410 disposed therein. The separation plate 410 is coupled to a heating lamp assembly 420. The heating lamp assembly 420 includes a plurality of linear heating lamps 422 that extend across a central opening of the separation plate 410. An annular heat shield 480 is coupled to the separation plate 410. The annular heat shield 480 reflects heat from the linear heating lamps 422 towards the floor 130. In some embodiments, it is contemplated that the annular heat shield 480 may be made from and/or coated with a reflective material. For example, the annular heat shield 480 may be gold plated.

The central opening of the separation plate 410 is substantially circular, and thus the annular heat shield 480 is substantially cylindrical. When the lower heating module 400 is assembled into the complete process chamber 100, each linear heating lamp 422 extends substantially horizontally below the floor 130. The linear heating lamps 422 are oriented substantially parallel to each other, such as within five degrees. A linear heating lamp 422 that extends across and below a peripheral portion of the floor 130 is shorter than a linear heating lamp 422 that extends across and below a central portion of the floor 130. Similarly, because the processing volume 140 is substantially cylindrical, a linear heating lamp 422 that extends across and below a peripheral portion of the processing volume 140 is shorter than a linear heating lamp 422 that extends across and below a central portion of the processing volume 140. Such an arrangement of linear heating lamps 422 provides efficiencies for the process chamber 100 having the substantially cylindrical processing volume 140 of the present disclosure compared to other chambers that do not have a substantially cylindrical processing volume. For example, a processing volume that is quadrilateral or hexagonal shaped when viewed from above has zones in corners that must be heated, which takes time and energy, whereas the substantially cylindrical processing volume 140 of the present disclosure has no such corners. Thus, the heating of the processing volume 140 of the present disclosure may be achieved faster and/or more efficiently than for other processing volumes.

A lower reflector plate 424 is coupled to, and disposed within, the annular heat shield 480. When the process chamber 100 is assembled, the lower reflector plate 424 is disposed below the floor 130. An upper surface 448 of the lower reflector plate 424 includes a plurality of linear channels 446 extending substantially parallel to each other across the upper surface 448. In some embodiments, it is contemplated that the upper surface 448 of the lower reflector plate 424 includes two or more linear channels 446. For example, the upper surface 448 of the lower reflector plate 424 may include three, four, five, six, seven, eight, nine, ten, or more linear channels 446. The plurality of linear heating lamps 422 extend within the plurality of linear channels 446, and thus heat from the linear heating lamps 422 is reflected off of sidewalls of the linear channels 446 towards the floor 130 in addition to being radiated towards the floor 130 directly. As shown in FIG. 7, each linear heating lamp 422 is located in a corresponding one of the plurality of linear channels 446. In some embodiments, it is contemplated that more than one linear heating lamp 422 may be located in a corresponding one of the plurality of linear channels 446.

Each linear channel 446 has a cross-sectional profile configured to reflect heat in a pre-determined distribution pattern. For example, the pre-determined distribution pattern may produce a substantially even distribution of heat. Alternatively, the pre-determined distribution pattern may focus peak irradiation at one or more specific regions on an underside of the susceptor 150 to enable control of temperature at those regions. It is contemplated that each linear channel 446 has at least one of a U-shaped cross section; a geometric straight-sided cross section, such as a V-shaped cross section, a rectangular cross section, a pentagonal cross section, a hexagonal cross section, or greater than six-sided cross section; a curved cross section, such as a portion of a circle, a portion of an ellipse, or a portion of a parabola; or a combination thereof.

As an example, an elliptical cross-sectional shape may facilitate the focusing of infrared radiation from a linear heating lamp 422. As another example, a parabolic cross-sectional shape may facilitate the collimating of infrared radiation from a linear heating lamp 422. As a further example, an angular cross-sectional shape may facilitate the diffusion of infrared radiation from a linear heating lamp 422. In some embodiments, it is contemplated that one or more linear channel 446 may have a cross section that is the same as another one or more linear channel 446. In some embodiments, it is contemplated that one or more linear channel 446 may have a cross section that is different from another one or more linear channel 446. In some embodiments, it is contemplated that one or more linear channel 446 may have a cross section that varies from a first shape to a second shape along a length of the linear channel 446.

Thus, the upper surface 448 of the lower reflector plate 424 can be designed to deliver irradiance peaks at many locations across the underside of the susceptor 150 to contribute to the facilitation of a desired thermal profile. In some embodiments, the lower reflector plate 424 is configured to generate up to as many irradiance peaks as the number of lamps in the plurality of linear heating lamps 422. In some embodiments, the lower reflector plate 424 is configured to generate a greater number of irradiance peaks than the number of lamps in the plurality of linear heating lamps 422. In some embodiments, it is contemplated that the lower reflector plate 424 may be made from and/or coated with a reflective material. For example, the lower reflector plate 424 may be gold plated.

In some embodiments, the lower reflector plate 424 includes a plurality of portions that are coupled together to form a disk-shaped plate. Additionally, in some embodiments, individual linear heating lamps 422 and individual portions of the lower reflector plate 424 may be accessed for removal and replacement by removing corresponding portions of the outer housing 402 and heat shield 480. It is contemplated that individual portions of the lower reflector plate 424 may be supported by one or more rail 484.

A neck shield 482 extends through the lower reflector plate 424. The neck shield 482 is configured to be disposed about the neck 132 of the floor 130. The neck shield 482 reflects heat away from the neck 132 of the floor 130. In some embodiments, it is contemplated that the neck shield 482 may be made from and/or coated with a reflective material. For example, the neck shield 482 may be gold plated.

One or more cooling tube 436 is disposed adjacent to the lower surface 426 of the lower reflector plate 424. The one or more cooling tube 436 is configured to convey a coolant, such as water or a refrigerant, such as R-22, R-32, or R-410A. In some embodiments, it is contemplated that a single cooling tube 436 may be routed in a serpentine configuration across the lower surface 426 of the lower reflector plate 424 between a coolant inlet 437 and a coolant outlet 438. In some embodiments, it is contemplated that a single cooling tube 436 may be coupled to the coolant inlet 437 and be split into branches, in which each branch is routed across the lower surface 426 of the lower reflector plate 424. In such embodiments, it is contemplated that the branches merge together into a single cooling tube 436 at the coolant outlet 438. In some embodiments, it is contemplated that at least a portion of the one or more cooling tube 436 may be located in a channel in the lower reflector plate 424. In some embodiments, it is contemplated that the one or more cooling tube 436 may be omitted.

The lower reflector plate 424 includes apertures, such as cooling slots 440, extending from the lower surface 426 to the upper surface 448. The cooling slots 440 are configured to route a cooling fluid, such as a gas, such as air, through the lower reflector plate 424. In some embodiments, it is contemplated that the cooling slots 440 may include a plurality of first slots 442 configured to cool the plurality of linear heating lamps 422 to maintain a target lamp temperature. An exemplary target lamp temperature is less than 800 degrees Celsius. As shown in FIG. 2, the first slots 442 are configured to direct cooling fluid generally towards each linear heating lamp 422. In some embodiments, it is contemplated that the cooling slots 440 may include a plurality of second slots 444 to direct the cooling fluid towards the floor 130. An exemplary target temperature of the floor 130 is about 400 to about 600 degrees Celsius.

It is contemplated that the numbers, sizes, and/or flow areas of first slots 442 relative to second slots 444 may be configured according to a desired proportion of cooling fluid to be flowed through each of the first slots 442 and the second slots 444. For example, it is contemplated that the desired total flow rate of cooling fluid through the first slots 442 may be greater than, equal to, or less than the desired total flow rate of cooling fluid through the second slots 444. Similarly, it is contemplated that the actual total flow rate of cooling fluid through the first slots 442 may be greater than, equal to, or less than the actual total flow rate of cooling fluid through the second slots 444. Thus, it is contemplated that the number of first slots 442 may be greater than, equal to, or less than the number of second slots 444. Additionally, it is contemplated that the size of first slots 442 may be greater than, equal to, or less than the size of second slots 444. Furthermore, it is contemplated that the flow area of first slots 442 may be greater than, equal to, or less than the flow area of second slots 444.

In some embodiments, it is contemplated that the cooling slots 440 are configured to give adequate backpressure to provide a desired flow pattern through the cooling slots 440. For example, the numbers, sizes, and/or flow areas of the cooling slots 440 may be configured such that the flow rate of cooling fluid through one first slot 442 may be greater than, equal to, or less than the flow rate of cooling fluid through another first slot 442. Similarly, the numbers, sizes, and/or flow areas of the cooling slots 440 may be configured such that the flow rate of cooling fluid through one second slot 444 may be greater than, equal to, or less than the flow rate of cooling fluid through another second slot 444.

A bottom cover 450 is coupled to the separation plate 410. An interior volume 452 is bounded at least in part by the bottom cover 450 and the lower reflector plate 424. As best shown in FIG. 8, one or more temperature sensors, such as one or more pyrometers 454, are mounted to a base 456 on the bottom cover 450. In some embodiments, it is contemplated that the base 456 may include a heat exchanger to provide cooling by a suitable fluid, such as water, supplied via a connecting hose (not shown). It is contemplated that each pyrometer 454 may be mounted so as to measure the surface temperature of a discrete portion of the underside of the susceptor 150. It is further contemplated that such measurement may be facilitated via a corresponding pyrometer tube (not shown) projecting through a hole 458 in the lower reflector plate 424, however in some embodiments, the corresponding pyrometer tube may be omitted.

As shown in FIG. 8, an inlet 472 permits a cooling fluid, such as a gas, such as air, to enter the interior volume 452. An exhaust 474 in the outer housing 402 provides an outlet for the cooling fluid. Power for the heating lamps is delivered via a power connection 490 at a side of the outer housing 402.

Figure 9A:
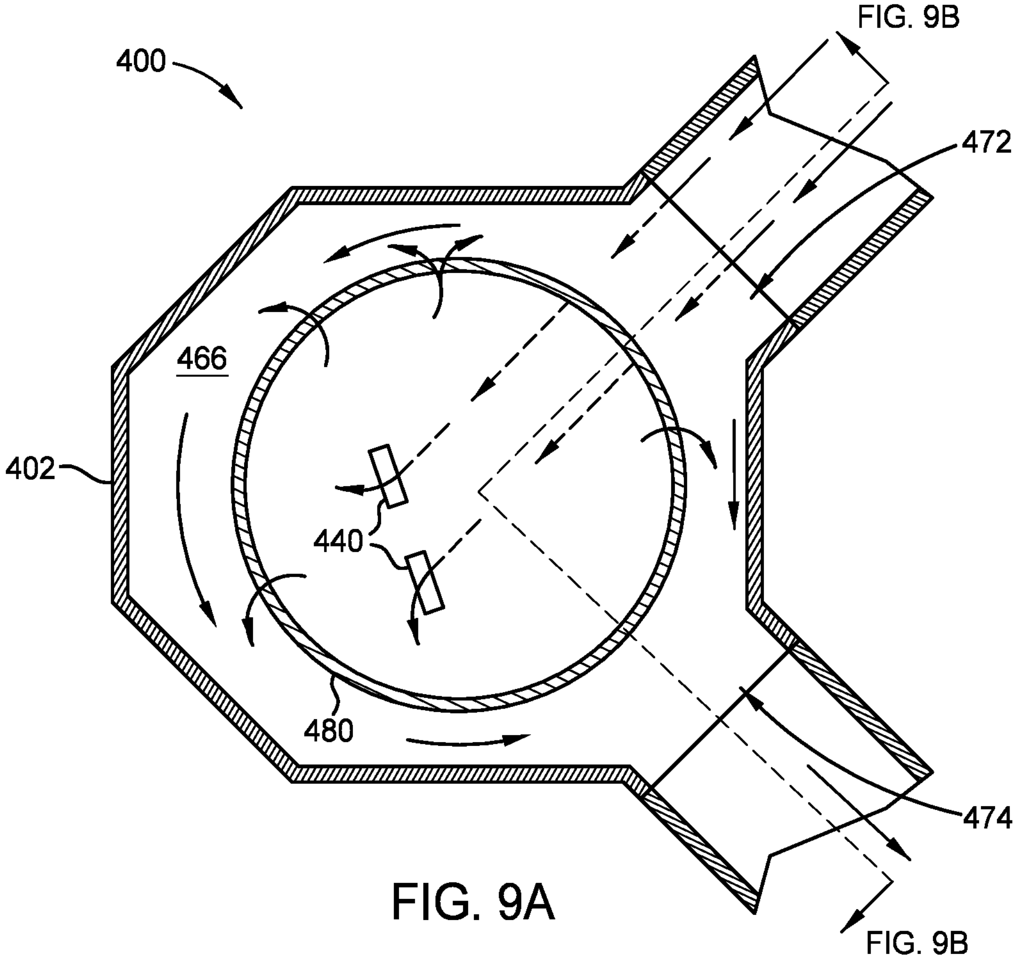
FIGS. 9A and 9B illustrate schematically the flow of cooling fluid through the part of the process chamber depicted in FIG. 7.
Figure 9B:
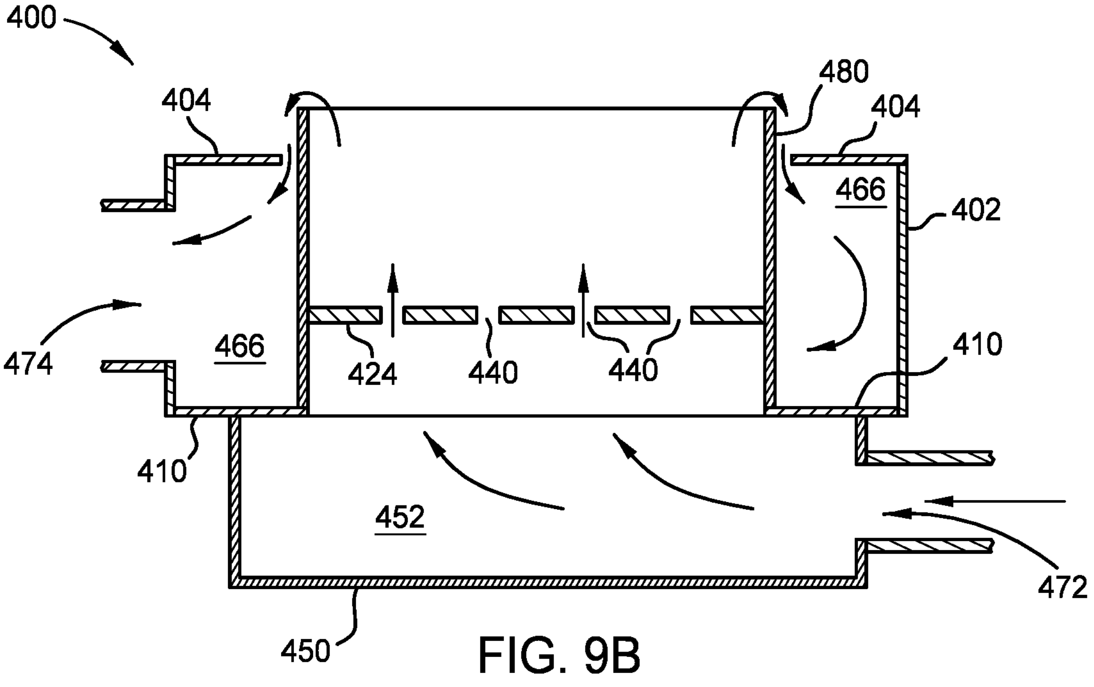

FIGS. 9A and 9B illustrate schematically the flow of cooling fluid through the lower heating module 400. Exemplary flow of cooling fluid is represented by arrows. FIG. 9A provides a top view of exemplary cooling fluid flow paths, and FIG. 9B provides a split cross-sectional side view of exemplary cooling fluid flow paths. Cooling fluid, such as a gas, such as air, enters the lower heating module 400 through inlet 472, and passes into the interior volume 452. The cooling fluid passes through the cooling slots 440. Cooling fluid that passes through the first slots 442 cools some portions of the lower reflector plate 424 and the linear heating lamps 422. Cooling fluid that passes through the second slots 444 cools other portions of the lower reflector plate 424.

The cooling fluid passes through the cooling slots 440 and into the annular heat shield 480. It is contemplated that the cooling fluid that contacts the annular heat shield 480 may cool the annular heat shield 480. The annular heat shield 480 directs the cooling fluid out the top of the annular heat shield 480 and towards the floor 130. It is contemplated that at least a portion of the cooling fluid may impinge upon a surface of the floor 130, thereby cooling the floor 130. The cooling fluid then passes between the outer housing 402 and the annular heat shield 480 into an annular volume 466 between the outer housing and the annular heat shield 480. The cooling fluid then exits the annular volume 266 through the exhaust 474.

Figure 10:
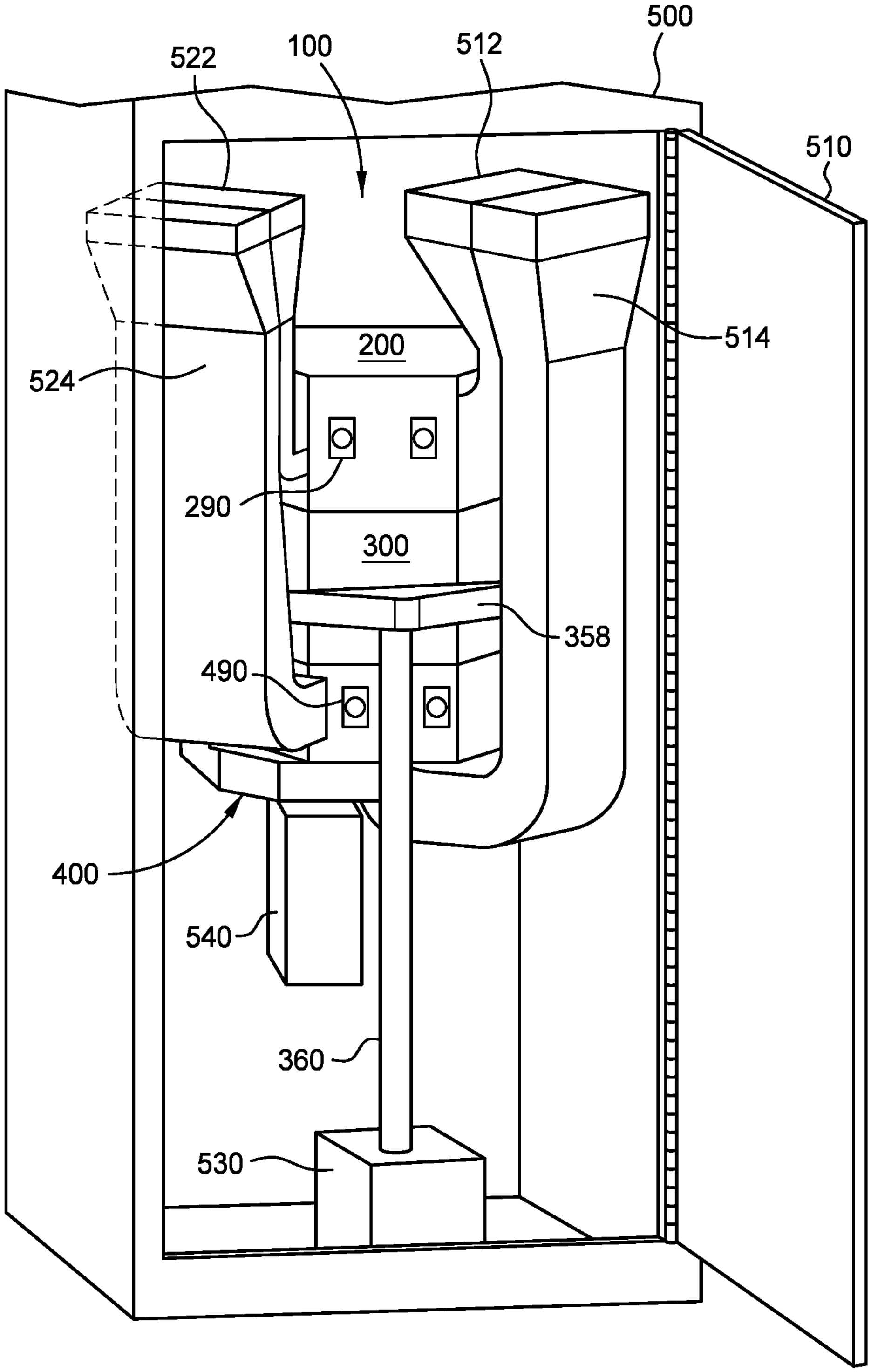
FIG. 10 is a schematic view of the process chamber of FIG. 1 installed for use.

FIG. 10 is a schematic view of the process chamber 100 installed for use. Process chamber 100 is mounted in a cabinet 500. In some embodiments, it is contemplated that suitable connections for utilities, such as electrical power supply, heat exchange fluids, and the like may be provided within, or adjacent to, the cabinet 500. The cabinet 500 has a door 510 that is opened to provide access to the process chamber 100.

Ducting 512, 514 provides for the feed of cooling fluid, such as a gas, such as air, to the upper heating module 200 and the lower heating module 400, respectively. Ducting 522, 524 provides for the exhaust of the cooling fluid from the upper heating module 200 and the lower heating module 400, respectively. In some embodiments, it is contemplated that the ducting 512, 514, 522, 524 may be connected to a dedicated circuit of the cooling fluid. Ducting 512 is positioned adjacent to ducting 514. In some embodiments, it is contemplated that the ducting 512 and 514 may be connected to form a single ducting conduit. Ducting 522 is positioned adjacent to ducting 524. In some embodiments, it is contemplated that the ducting 522 and 524 may be connected to form a single ducting conduit.

Power connections 290 for the heating lamps 222 of the upper heating module 200 are located at the side of the outer housing 202 of the upper heating module 200 between the ducting 512 and ducting 522. Power connections 490 for the heating lamps 422 of the lower heating module 400 are located at the side of the outer housing 402 of the lower heating module 400 between the ducting 514 and ducting 524. Additionally, the exhaust cap 358 and exhaust conduit 360 are located at the side of the chamber body 300 are located between the ducting 514 and ducting 524. The exhaust conduit 360 is connected to a vacuum system 530. A susceptor movement mechanism 540, connected to and located below the lower heating module 400, provides for manipulating the susceptor 150 in the processing volume 140 of the process chamber 100. The susceptor movement mechanism 540 is connected to the shaft 154 of the susceptor support 126. Manipulation of the susceptor 150 includes rotating the susceptor 150. It is contemplated that manipulation of the susceptor 150 may include raising and lowering the susceptor 150.

The ducting 512, 514, 522, 524, the power connections 290, 490, the exhaust cap 358, the exhaust conduit 360, and the vacuum system 530 are positioned between the process chamber 100 and the door 510. Thus, once the door 510 is opened, an operator has easy access to the ducting 512, 514, 522, 524, the power connections 290, 490, the exhaust cap 358, the exhaust conduit 360, and the vacuum system 530. Such easy access facilitates effective and efficient maintenance of the process chamber 100. The susceptor movement mechanism 540 is also easily accessed, such as following the removal of the exhaust conduit 360.

In the operation of processing chambers, such as epitaxial processing chambers, there exist trade-offs between the size of a processing chamber, the efficacy of the processing of a substrate, and the capital and operating costs. For example, a processing chamber of a size in which the edge of a substrate is positioned close to an interior wall may cause the edge of the substrate to experience a different temperature than the rest of the substrate, and therefore the substrate may receive a non-uniform deposition of material. However, a larger processing chamber, such as one with a greater diameter is generally more expensive than a smaller processing chamber, and thus the capital cost of equipment increases.

Additionally, a larger diameter ceiling may require an increased height to enable the ceiling to adequately withstand the pressure differentials to which the ceiling is subjected. Therefore, a processing volume is increased, thereby necessitating more processing gas in order to achieve the desired concentration of gas during the processing of a substrate. Such a greater height of the ceiling also necessitates the placement of the heating lamps above the ceiling to be further from the substrate. Therefore, more energy is required for heating the substrate. Thus, operational costs are increased in terms of gas usage and power consumption.

In contrast with pre-existing processing chambers, the process chamber 100 of the present disclosure facilitates a uniformity of deposition of material on a substrate 110 without the detrimental capital and operating costs described above. For example, appropriate selection and control of the heating lamps 222, 422, in combination with the tailoring of the cross-sectional shape of each linear channel 246, 446, facilitates the establishment of a substrate 110 temperature that is substantially uniform across the entire substrate 110 without the edge effects described above with respect to pre-existing processing chambers.

Figure 11A:
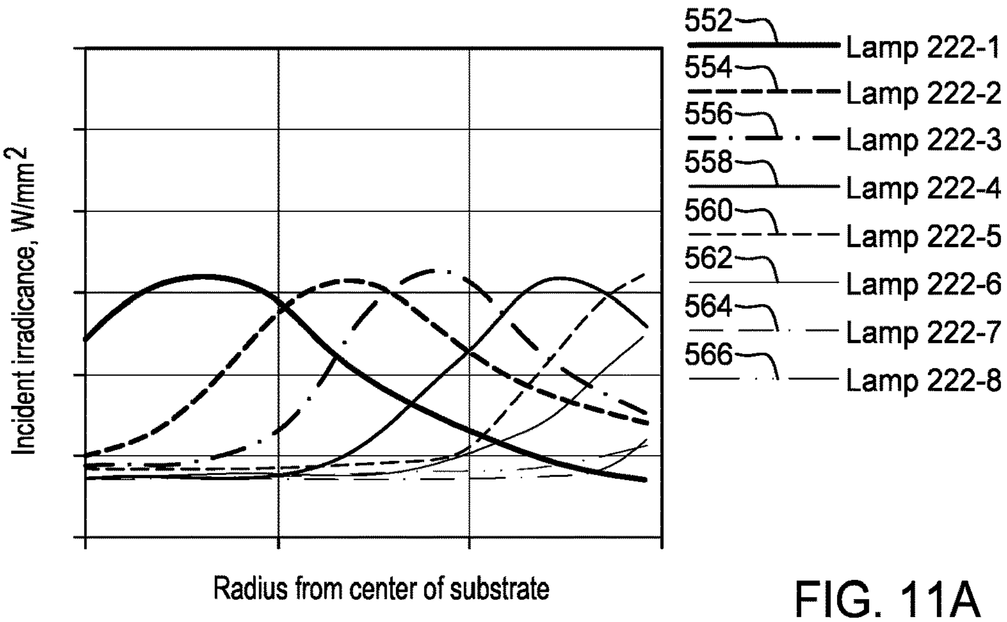
FIGS. 11A and 11B are graphs of incident irradiance plotted against a radius measured from the center of a substrate.

For example, FIG. 11A illustrates an example graph of the incident irradiance from each heating lamp 222 plotted against a radius measured from the center of the substrate 110. Lines 552, 554, 556, 558, 560, 562, 564, and 566 represent the irradiance created by each of eight heating lamps 222-1 to 222-8, respectively, and each corresponding linear channel 246. Each heating lamp 222 and the corresponding linear channel 246 create peaks of irradiance at specific radii. It is contemplated that the specific radius at which a peak of irradiance from any one heating lamp 222 may be the same as or different from the specific radius at which a peak of irradiance is produced from any other heating lamp 222. In some embodiments, it is contemplated that machine learning may be used to determine one or more configurations of heating lamp 222 number, intensity, control settings, and/or cross-sectional shape of corresponding linear channel(s) 246 in order to achieve a desired temperature and/or temperature profile across a substrate 110.

Figure 11B:
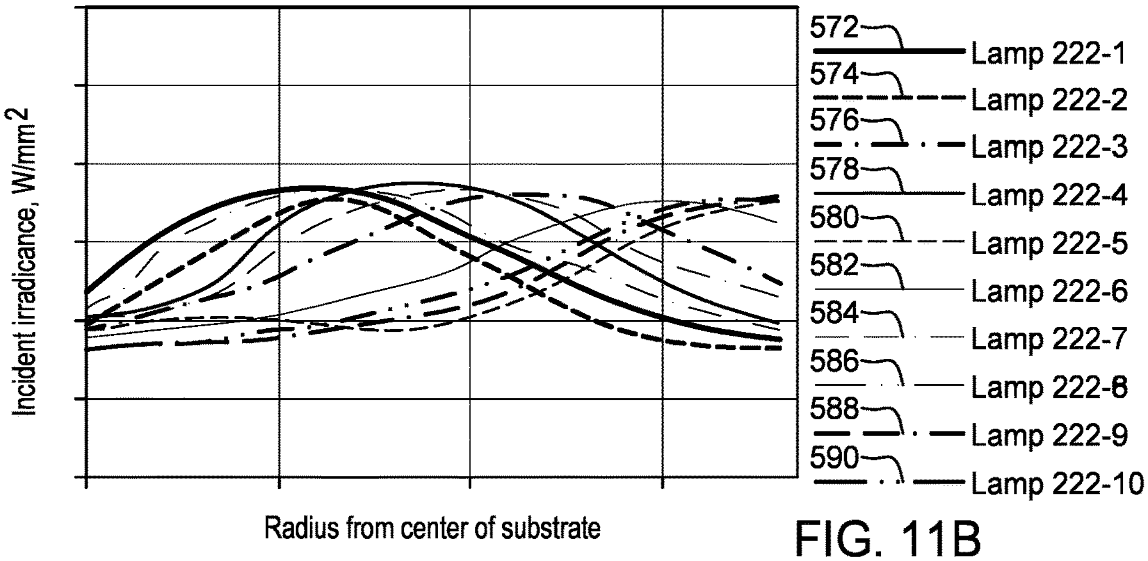

Additionally, FIG. 11B illustrates an example graph of the incident irradiance from each heating lamp 422 plotted against a radius measured from the center of the substrate 110. Lines 572, 574, 576, 578, 580, 582, 584, 586, 588, and 590 represent the irradiance created by each of ten heating lamps 422-1 to 422-10, respectively, and each corresponding linear channel 446. Each heating lamp 422 and the corresponding linear channel 446 create peaks of irradiance at different radii. It is contemplated that the specific radius at which a peak of irradiance from any one heating lamp 422 may be the same as or different from the specific radius at which a peak of irradiance is produced from any other heating lamp 422. In some embodiments, it is contemplated that machine learning may be used to determine one or more configurations of heating lamp 422 number, intensity, control settings, and/or cross-sectional shape of corresponding linear channel(s) 446 in order to achieve a desired temperature and/or temperature profile across a substrate 110.

Figure 11C:
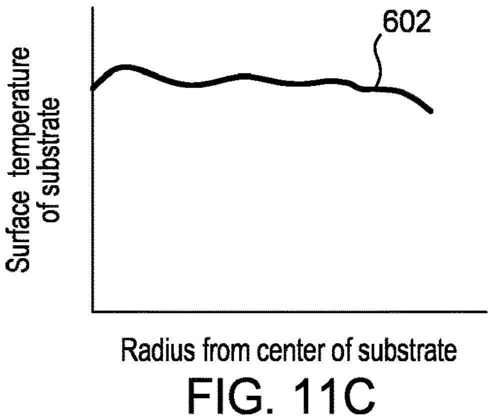
FIG. 11C is a graph of a substrate surface temperature plotted against a radius measured from the center of the substrate.

As a result of the optimizations depicted in FIGS. 11A and 11B, FIG. 11C illustrates an example graph 600 of a resultant substrate surface temperature 602 plotted against a radius measured from the center of the substrate 110. The graph 600 shows a general uniformity of substrate surface temperature across the entire substrate 110. The general uniformity of substrate surface temperature across the entire substrate 110 is achieved substantially without the edge effects described above with respect to pre-existing processing chambers.

Figure 12A:
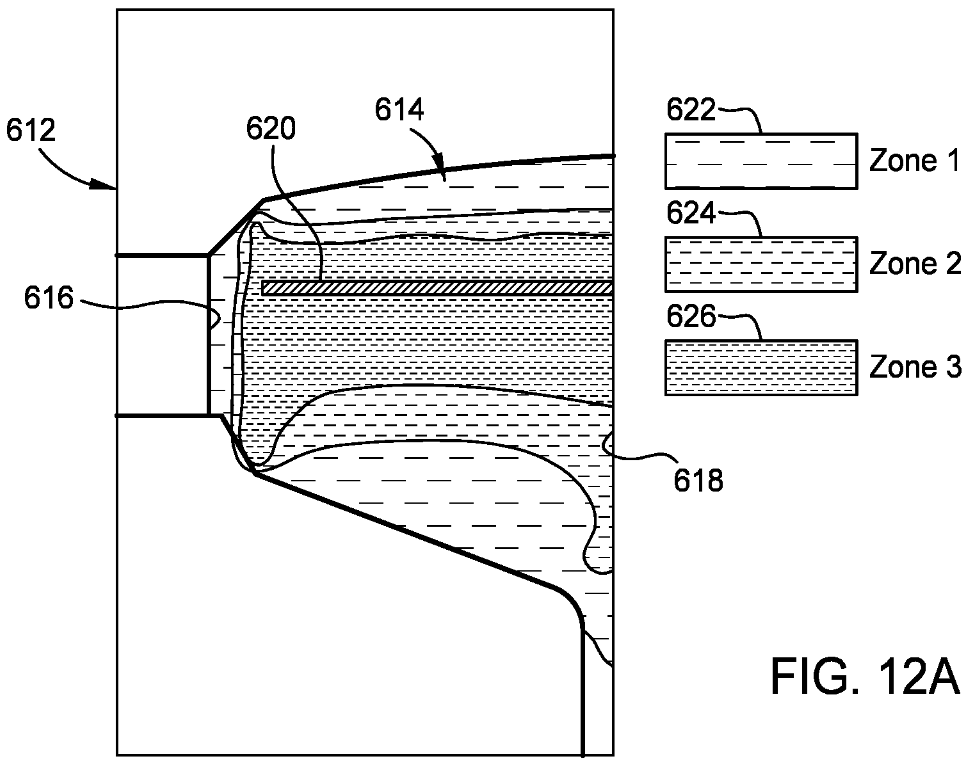
FIG. 12A is a plot of temperature within a processing volume of a pre-existing processing chamber.
Figure 12B:
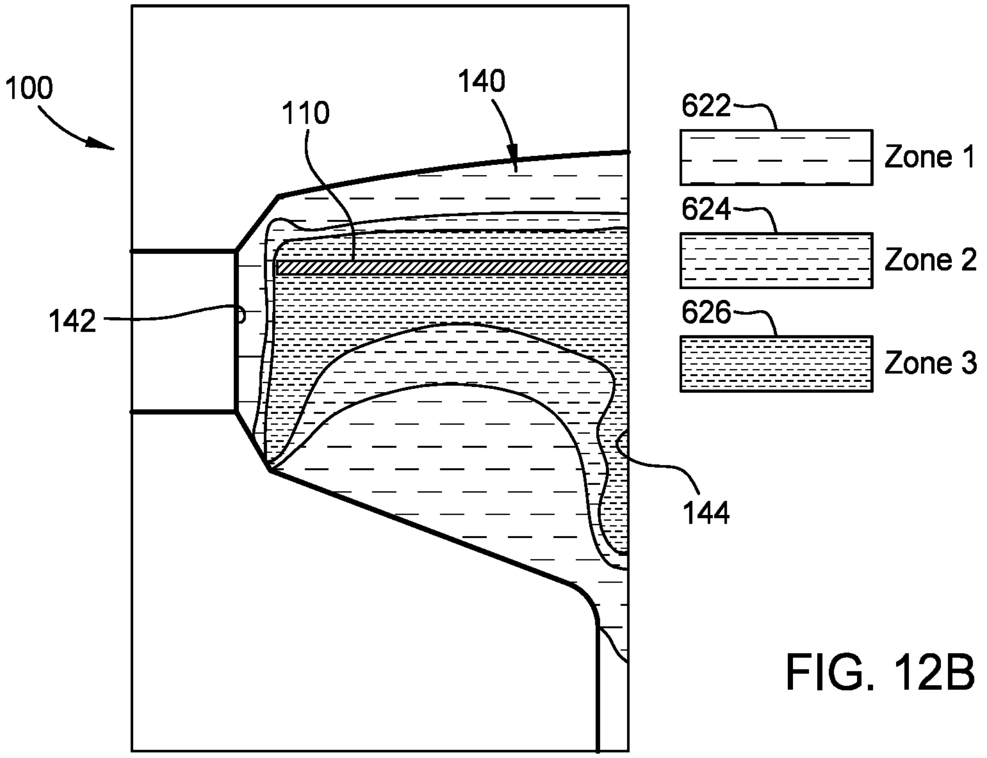
FIG. 12B is a plot of temperature within a processing volume of the process chamber of FIG. 1.

FIGS. 12A and 12B illustrate an example of the heating efficiency that may be obtained by the process chamber 100 of the present disclosure compared to an example pre-existing processing chamber. FIG. 12A is an example plot of temperature within a processing volume 614 of an example pre-existing processing chamber 612 containing a substrate 620 undergoing processing. The processing volume 614 is shown in a half cross section taken from a side 616 of the processing volume 614 to the center 618 of the processing volume 614. Zone-1 622 shows where the temperature is relatively cool. Zone-2 624 shows where the temperature is relatively warmer. Zone-3 626 shows where the temperature is relatively hot. An example temperature range for Zone-1 622 is 200-600 degrees Celsius. An example temperature range for Zone-2 624 is 600-800 degrees Celsius. An example temperature range for Zone-3 626 is 800-1000 degrees Celsius.

As a comparison, FIG. 12B is an example plot of temperature within the processing volume 140 of a process chamber 100 of the present disclosure containing a substrate 110 undergoing processing. The processing volume 140 is shown in a half cross section taken from a side 142 of the processing volume 140 to the center 144 of the processing volume 140. Zone-1 622, Zone-2 624, and Zone-3 626 represent the same relative temperatures and temperature ranges as for FIG. 12A.

In comparing the plots of FIGS. 12A and 12B, the substrate 620 undergoing processing in the example pre-existing processing chamber 612 and the substrate 110 undergoing processing in the process chamber 100 of the present disclosure are of the same size, such as having the same diameter. However, the processing volume 140 of the process chamber 100 of FIG. 12B has an inner diameter that is 10% less than the inner diameter of the processing volume 614 of the example pre-existing processing chamber 612. Consequently, the volume of the processing volume 140 of the process chamber 100 of FIG. 12B is less than the volume of the processing volume 614 of the example pre-existing processing chamber 612.

The plot of FIG. 12A shows that a significant portion of the processing volume 614 of the example pre-existing processing chamber 612 experiences the temperature of Zone-3 626. In comparison, the plot of FIG. 12B shows that a smaller portion of the processing volume 140 of the process chamber 100 of the present disclosure experiences the temperature of Zone-3 626. As shown in FIG. 12B, the region of the processing volume 140 of the process chamber 100 of the present disclosure experiencing the temperature of Zone-3 626 is more concentrated around the substrate 110, than the equivalent comparative region depicted in FIG. 12A. Thus, for the process chamber 100 of the present disclosure, less energy is wasted in heating a region away from the substrate 110 compared to the energy used for heating the processing volume 614 of the example pre-existing processing chamber 612. Therefore, operation of the process chamber 100 of the present disclosure may be accomplished with a reduced power requirement compared to the example pre-existing processing chamber 612.

The process chamber 100 of the present disclosure facilitates the processing of a substrate with greater energy efficiency and less process gas usage than pre-existing processing chambers. Therefore, operators of the process chamber 100 of the present disclosure may realize operational cost savings compared to the operation of pre-existing processing chambers. Additionally, the design of the upper 200 and lower 400 heating modules of the process chamber 100 of the present disclosure enables the process chamber 100 of the present disclosure to be smaller than pre-existing processing chambers for the processing of similarly-sized substrates. Therefore, operators of the process chamber 100 of the present disclosure may realize capital cost savings compared to the pre-existing processing chambers. Additionally, the process chamber 100 of the present disclosure facilitates the processing of a substrate while mitigating the propensity to create undesirable anomalous deposition patterns at the edge of the substrate.

In some embodiments, it is contemplated that the chamber body 300 of the process chamber 100 of the present disclosure may have an inner diameter that is 90% of the inner diameter of a pre-existing processing chamber configured to process substrates of the same size as substrates that are processed within the chamber body 300.

In some embodiments, it is contemplated that the processing volume 140 of the process chamber 100 of the present disclosure may be 60% of the processing volume of a pre-existing processing chamber configured to process substrates of the same size as substrates that are processed within the processing volume 140.

In some embodiments, it is contemplated that operation of the process chamber 100 of the present disclosure to process a given substrate may consume 70% of the gas required to process the same substrate in a pre-existing processing chamber.

In some embodiments, it is contemplated that operation of the process chamber 100 of the present disclosure to process a given substrate may consume 70% of the energy required to process the same substrate in a pre-existing processing chamber.

The process chamber 100 of the present disclosure is configured such that an operator has easy access to ducting, power connections, and gas exhaust conduits. Such easy access facilitates effective and efficient maintenance of the process chamber 100. Furthermore, components of the process chamber 100 of the present disclosure that are outside the chamber body 300 may be accessed for maintenance, repair, and/or replacement while the pressure within the processing volume 140 of the chamber body 300 is maintained at a desired level, such as at or near a vacuum.

In one or more embodiment, a chamber body includes a ceiling disposed above a floor. The chamber body also includes a chassis disposed between the ceiling and the floor, the chassis having a first opening aligned with the ceiling and the floor. The chamber body further includes an injector ring disposed between the chassis and the ceiling, the injector ring having a second opening aligned with the ceiling, the floor, and the first opening. An upper clamp ring is configured to secure a first base of the ceiling to the injector ring. A lower clamp ring is configured to secure a second base of the floor to the chassis. A plurality of clamping rods is disposed through the upper clamp ring, the injector ring, the chassis, and the lower clamp ring.

In one or more embodiment, a process chamber includes a chamber body. The chamber body has a ceiling disposed above a floor. A chassis is disposed between the ceiling and the floor, the chassis having a first opening aligned with the ceiling and the floor. An injector ring is disposed between the chassis and the ceiling, the injector ring having a second opening aligned with the ceiling, the floor, and the first opening. The ceiling, the floor, the first opening, and the second opening define a processing volume. The process chamber further includes an upper heating module coupled to the chamber body above the ceiling, and a lower heating module coupled to the chamber body below the floor. The upper heating module is removable from the chamber body while a pressure within the processing volume is maintained at a desired level different from an ambient pressure.

While the foregoing is directed to embodiments of the present disclosure, other and further embodiments of the disclosure may be devised without departing from the basic scope thereof, and the scope thereof is determined by the claims that follow.

What is claimed is:

1. A process chamber comprising:

- a chamber body including a ceiling disposed above a floor, the ceiling and the floor forming boundaries of a processing volume;
- an upper heating module coupled to the chamber body above the ceiling, the upper heating module including:
  - a first heating lamp assembly, the first heating lamp assembly including:
    - a first linear heating lamp extending above a peripheral portion of the ceiling and having a first horizontal length; and
    - a second linear heating lamp extending above a central portion of the ceiling and having a second horizontal length greater than the first horizontal length; and
- a lower heating module coupled to the chamber body below the floor, the lower heating module including:
  - a second heating lamp assembly, the second heating lamp assembly including:
    - a third linear heating lamp having a third horizontal length; and
    - a fourth linear heating lamp having a fourth horizontal length different from the third horizontal length;
  - a lower reflector plate disposed below the floor; and
  - an annular heat shield disposed around and extending above the second heating lamp assembly and the lower reflector plate;
- wherein the entire length of each of the first linear heating lamp, the second linear heating lamp, the third linear heating lamp, and the fourth linear heating lamp is linear.

2. The process chamber of claim 1, wherein the lower reflector plate comprises an upper surface, the upper surface comprising a plurality of linear channels extending parallel to each other.

3. The process chamber of claim 1, further comprising a neck shield extending through the lower reflector plate.

4. The process chamber of claim 1, wherein:
the third linear heating lamp extends below a peripheral portion of the floor;
the fourth linear heating lamp extends below a central portion of the floor; and
the fourth linear heating lamp is longer than the third linear heating lamp.

5. The process chamber of claim 4, wherein:
the first linear heating lamp is located in a first channel of an upper reflector plate; and
the first linear heating lamp and the first channel are configured to provide:
a first infrared irradiance to a peripheral portion of a substrate located in the processing volume, and
a second infrared irradiance to a central portion of the substrate; and
the first infrared irradiance is greater than the second infrared irradiance.

6. The process chamber of claim 5, wherein:
the second linear heating lamp is located in a second channel of the upper reflector plate; and
the second linear heating lamp and the second channel are configured to provide:
a third infrared irradiance to the central portion of the substrate, and
a fourth infrared irradiance to the peripheral portion of the substrate; and
the third infrared irradiance is greater than the fourth infrared irradiance.

7. The process chamber of claim 6, wherein:
the third linear heating lamp is located in a third channel of the lower reflector plate;
the third linear heating lamp and the third channel are configured to provide:
a fifth infrared irradiance to a peripheral portion of a substrate support located in the processing volume, and
a sixth infrared irradiance to a central portion of the substrate support, the fifth infrared irradiance greater than the sixth infrared irradiance;
the fourth linear heating lamp is located in a fourth channel of the lower reflector plate; and
the fourth linear heating lamp and the fourth channel are configured to provide:
a seventh infrared irradiance to the central portion of the substrate support, and
an eighth infrared irradiance to the peripheral portion of the substrate support, the seventh infrared irradiance greater than the eighth infrared irradiance.

8. The process chamber of claim 7, wherein:
the infrared irradiance to the central portion of the substrate support provided by the fourth linear heating lamp and the fourth channel is greater than the infrared irradiance to the peripheral portion of the substrate support provided by the third linear heating lamp and the third channel.

9. The process chamber of claim 1, wherein:
the processing volume is cylindrical.

10. The process chamber of claim 6, wherein:
the third infrared irradiance is greater than the first infrared irradiance.

11. The process chamber of claim 1, wherein:
the first and second linear heating lamps extend horizontally above the ceiling; and
the third and fourth linear heating lamps extend horizontally below the floor.

12. The process chamber of claim 6, wherein at least one of the first and second channels of the upper reflector plate have at least one of a U-shaped cross section, a V-shaped cross section, a rectangular cross section, a pentagonal cross section, a hexagonal cross section, a greater than six-sided cross section, a curved cross section, or a combination thereof.

13. The process chamber of claim 12, wherein the cross section of at least one of the first and second channels of the upper reflector plate varies from a first shape to a second shape along a length of the channel.

14. The process chamber of claim 1, wherein the upper heating module further comprises:
an outer housing having a cooling fluid inlet and a cooling fluid exhaust;
a lid on the outer housing;
a reflector mounting ring disposed in the outer housing, an upper reflector plate coupled to the reflector mounting ring, the upper reflector plate including a plurality of apertures; and
a baffle extending between the lid and the reflector mounting ring, the baffle having an opening coupled to the cooling fluid inlet.

15. The process chamber of claim 14, wherein the baffle inhibits direct fluid communication between the cooling fluid inlet and the cooling fluid exhaust.

16. The process chamber of claim 15, wherein the baffle encloses an interior volume and isolates the interior volume from an annular volume between the baffle and the outer housing.

17. The process chamber of claim 16, wherein cooling fluid entering the interior volume via the opening is directed by the baffle through the plurality of apertures in the upper reflector plate.

18. The process chamber of claim 1, wherein the upper heating module further comprises:
a lamp mounting ring coupled to the first heating lamp assembly; and
a second annular heat shield coupled to the lamp mounting ring and disposed around the first heating lamp assembly.

19. The process chamber of claim 18, wherein the second annular heat shield reflects heat from the first and second linear heating lamps towards the ceiling of the chamber body.

20. The process chamber of claim 18, wherein the second annular heat shield is gold plated.

* * * * *